Sept. 2, 1930.  R. A. CARLETON  1,775,017
ELECTRIC FLUID HEATING APPARATUS
Filed Nov. 19, 1928   12 Sheets-Sheet 2
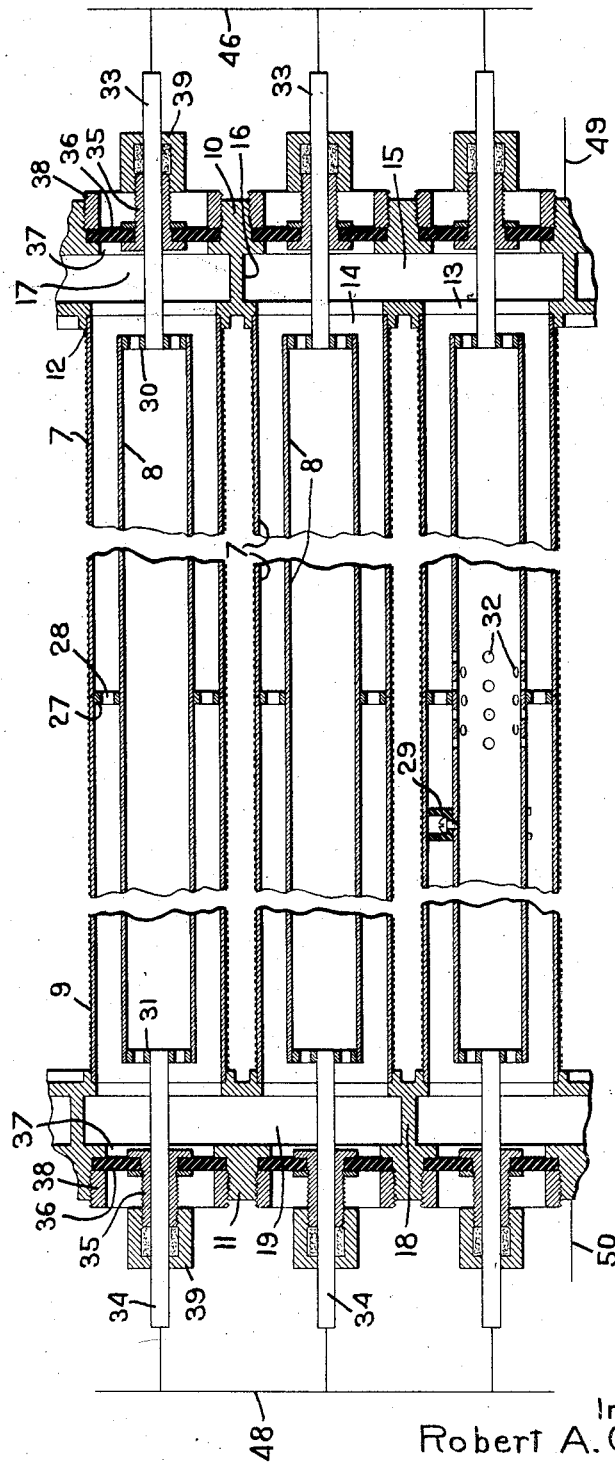
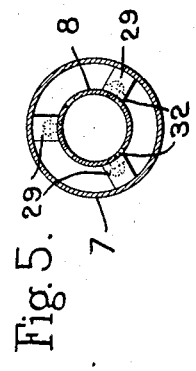
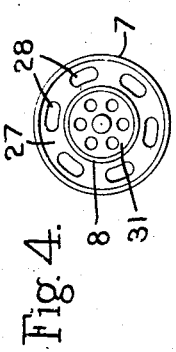
Inventor.
Robert A. Carleton
by Heard Smith & Tennant.
Attys.

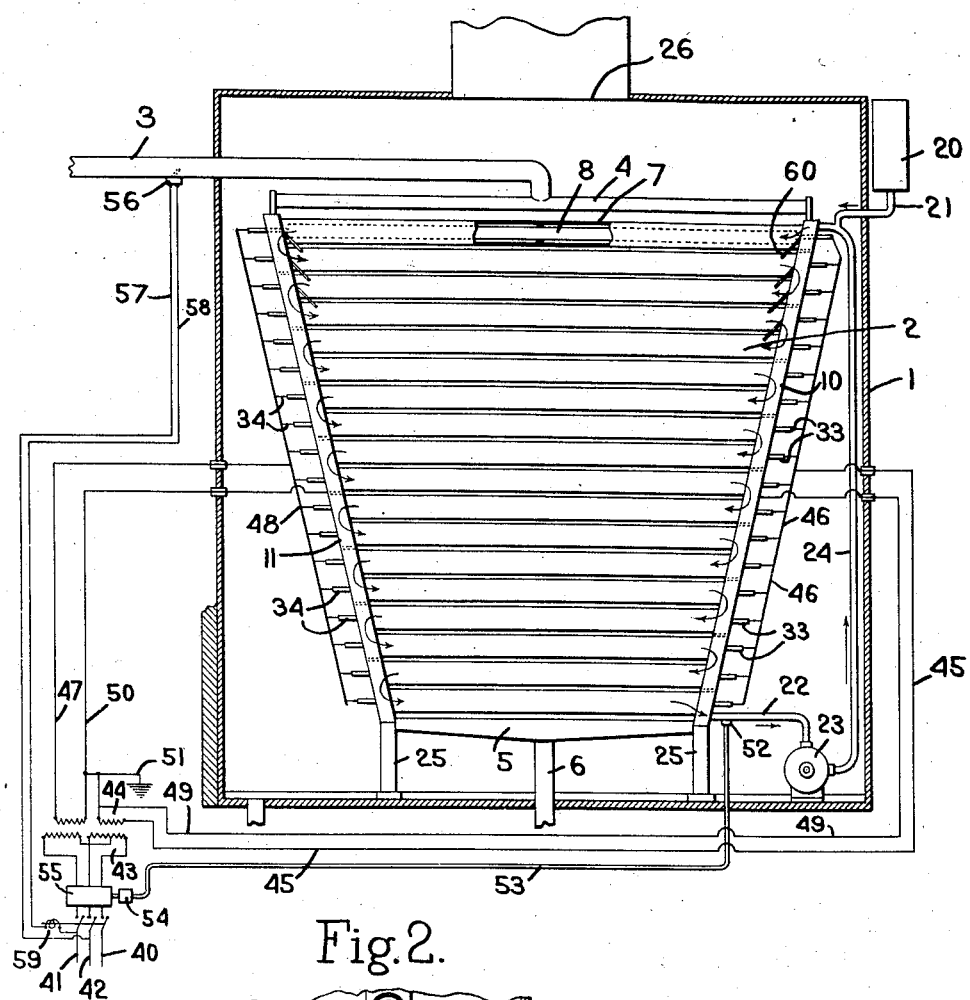
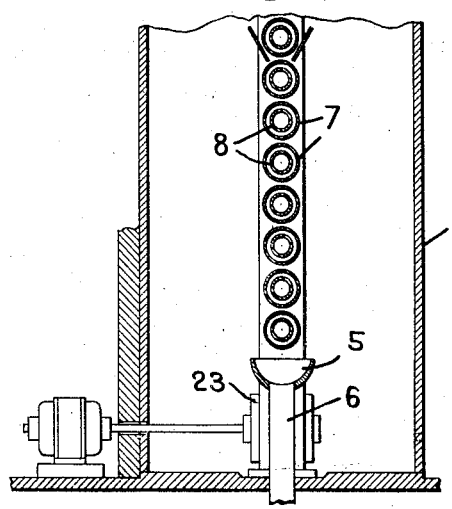
Fig.1.
Fig.2.
Inventor.
Robert A. Carleton
by Heard Smith & Tennant.
Attys.

Sept. 2, 1930.  R. A. CARLETON  1,775,017
ELECTRIC FLUID HEATING APPARATUS
Filed Nov. 19, 1928   12 Sheets-Sheet 5

Inventor.
Robert A. Carleton
by Heard Smith & Tennant
Attys.

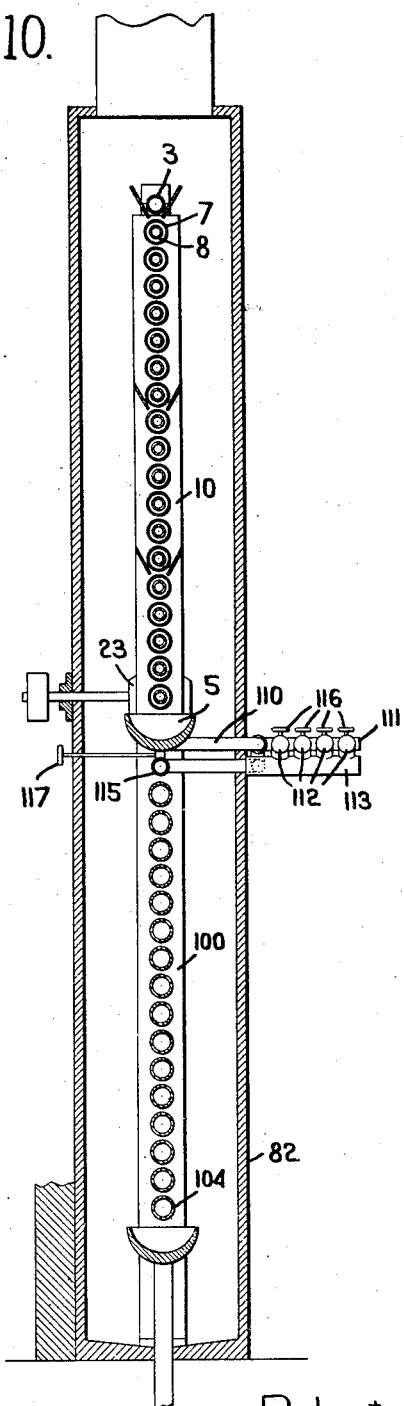

Sept. 2, 1930.  R. A. CARLETON  1,775,017
ELECTRIC FLUID HEATING APPARATUS
Filed Nov. 19, 1928  12 Sheets-Sheet 7
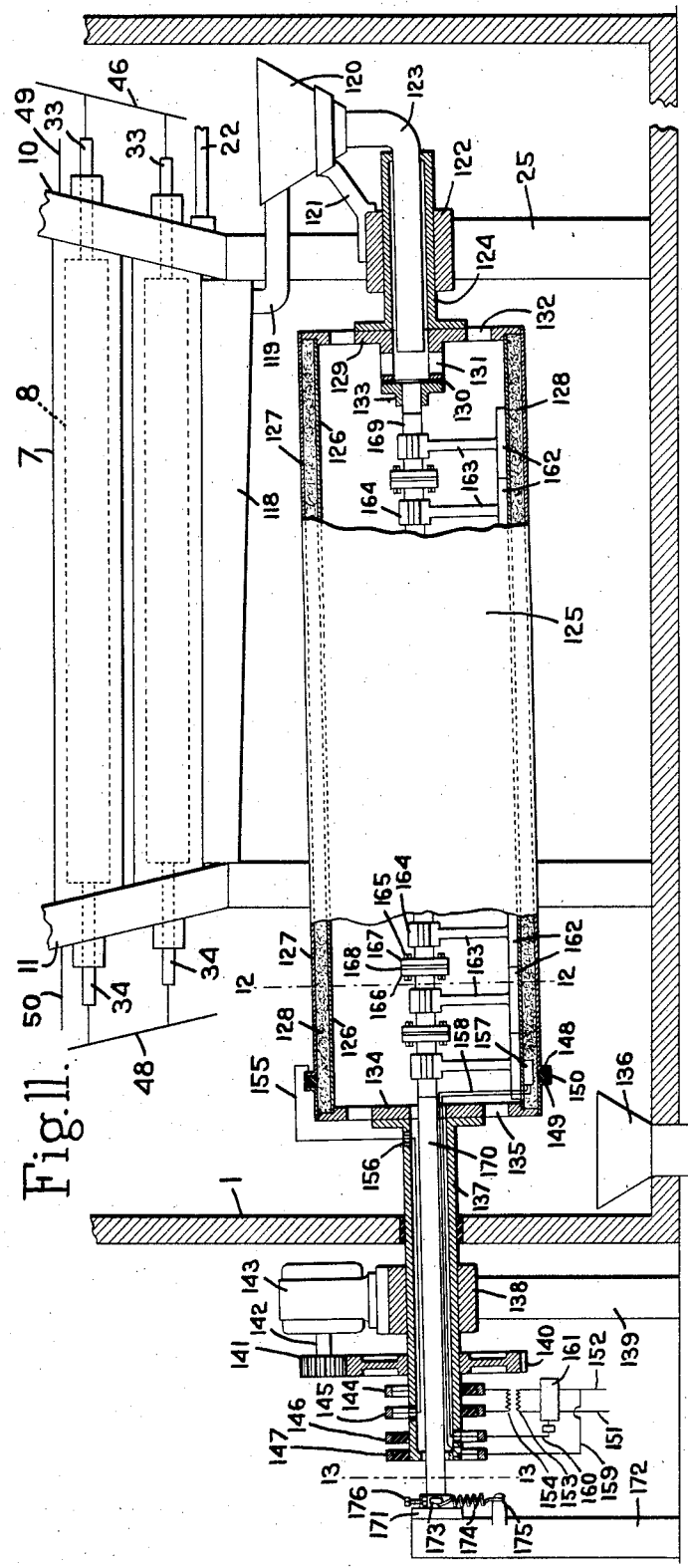
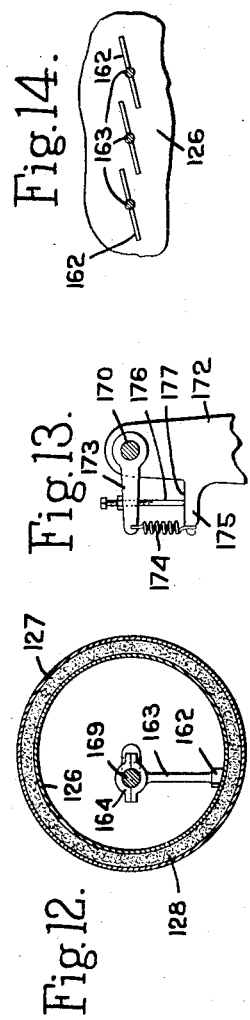
Inventor.
Robert A. Carleton
by Heard Smith & Tennant
Attys.

Sept. 2, 1930.   R. A. CARLETON   1,775,017
ELECTRIC FLUID HEATING APPARATUS
Filed Nov. 19, 1928   12 Sheets-Sheet 8
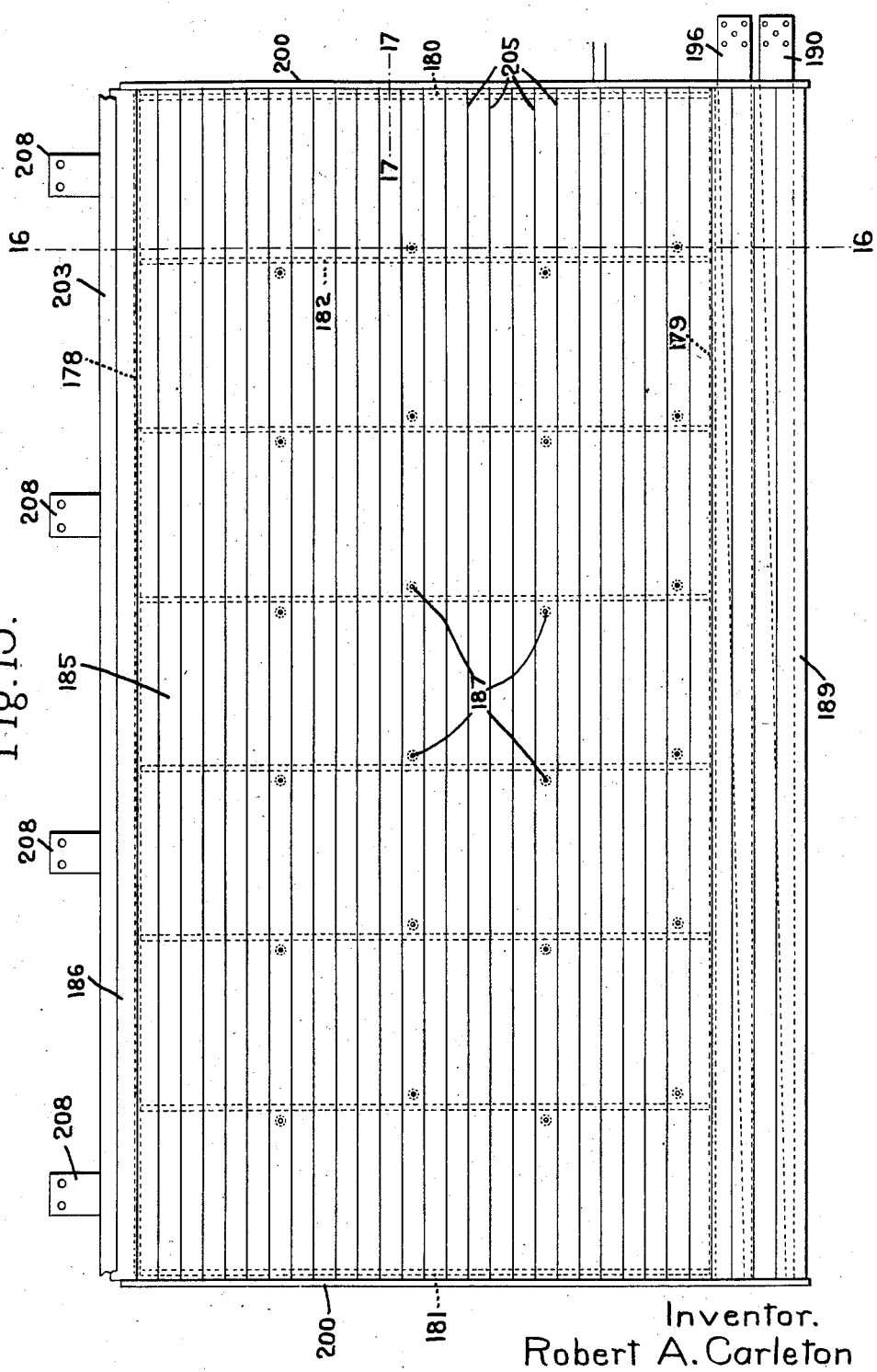
Inventor.
Robert A. Carleton
by Heard Smith & Tennant
Attys.

Sept. 2, 1930.    R. A. CARLETON    1,775,017
ELECTRIC FLUID HEATING APPARATUS
Filed Nov. 19, 1928    12 Sheets-Sheet 9
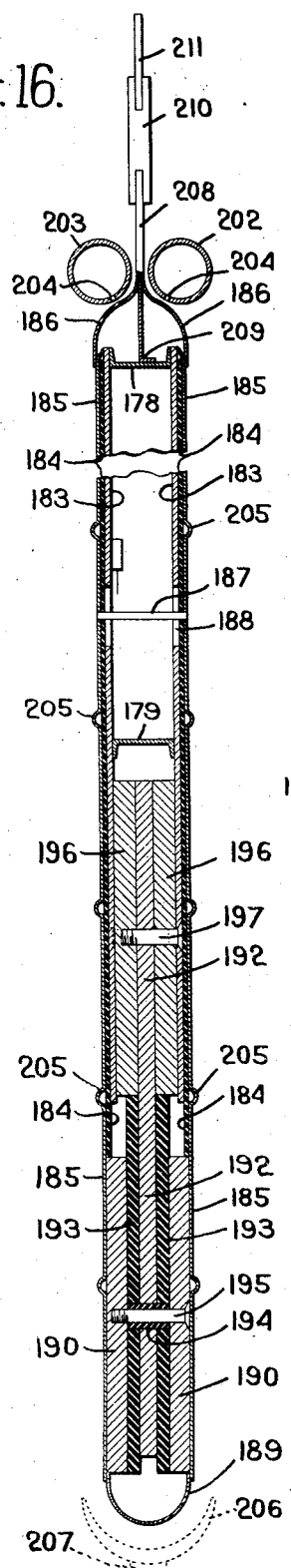
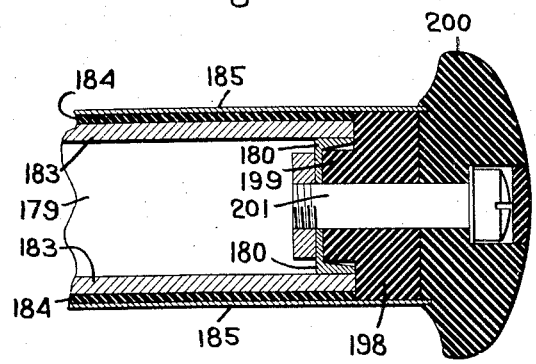
Inventor.
Robert A. Carleton
by Heard Smith & Tennant.
Attys.

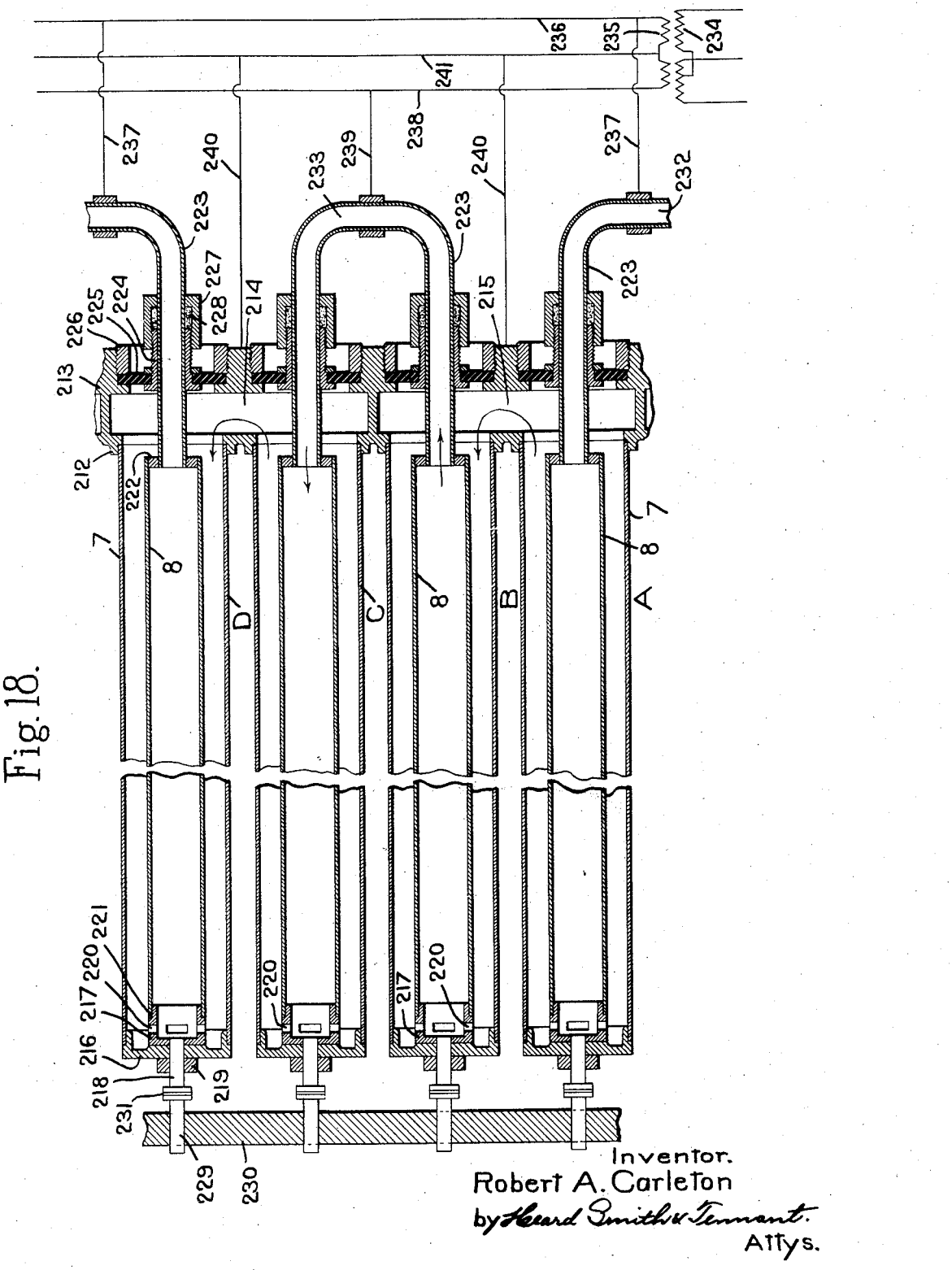

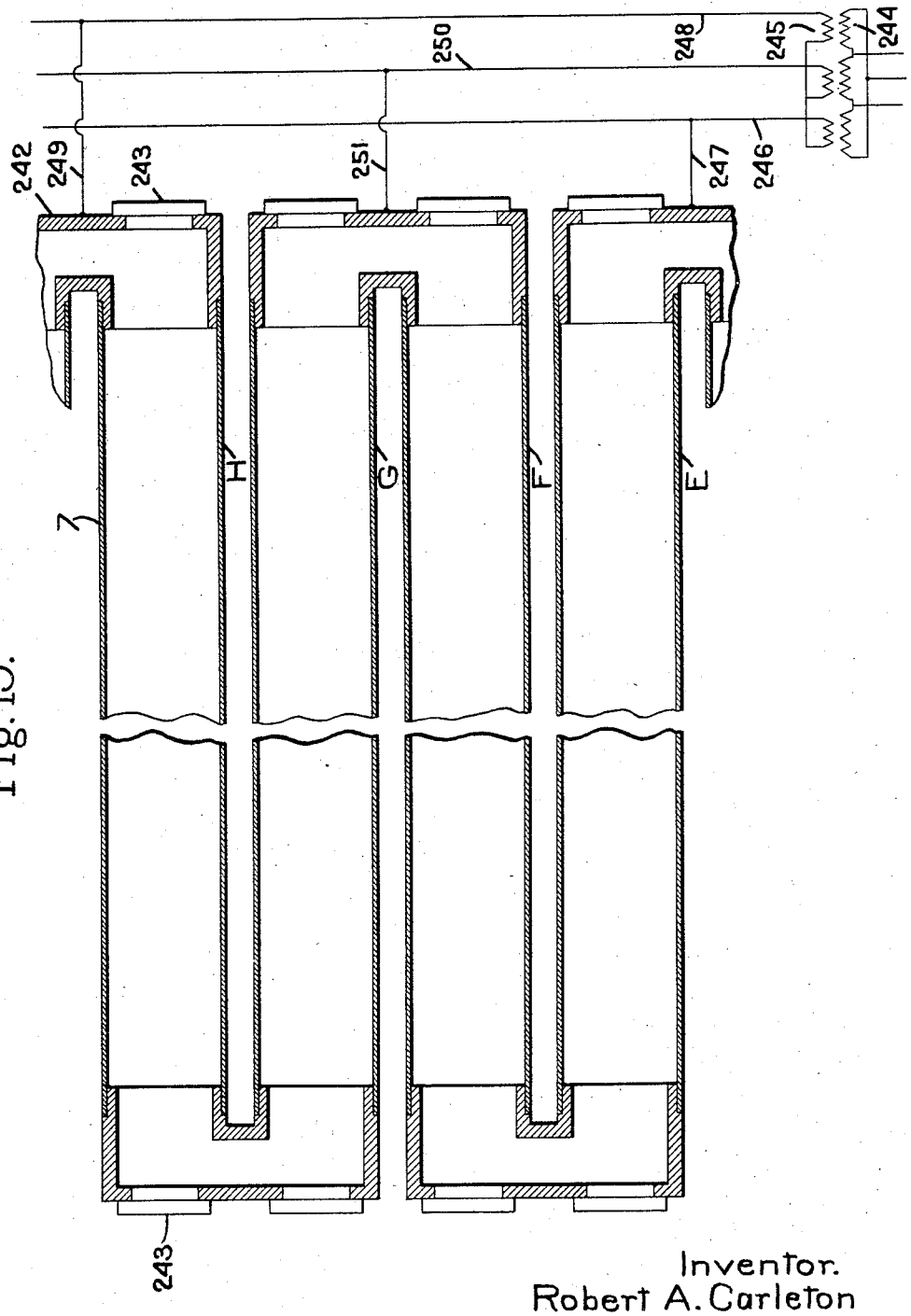

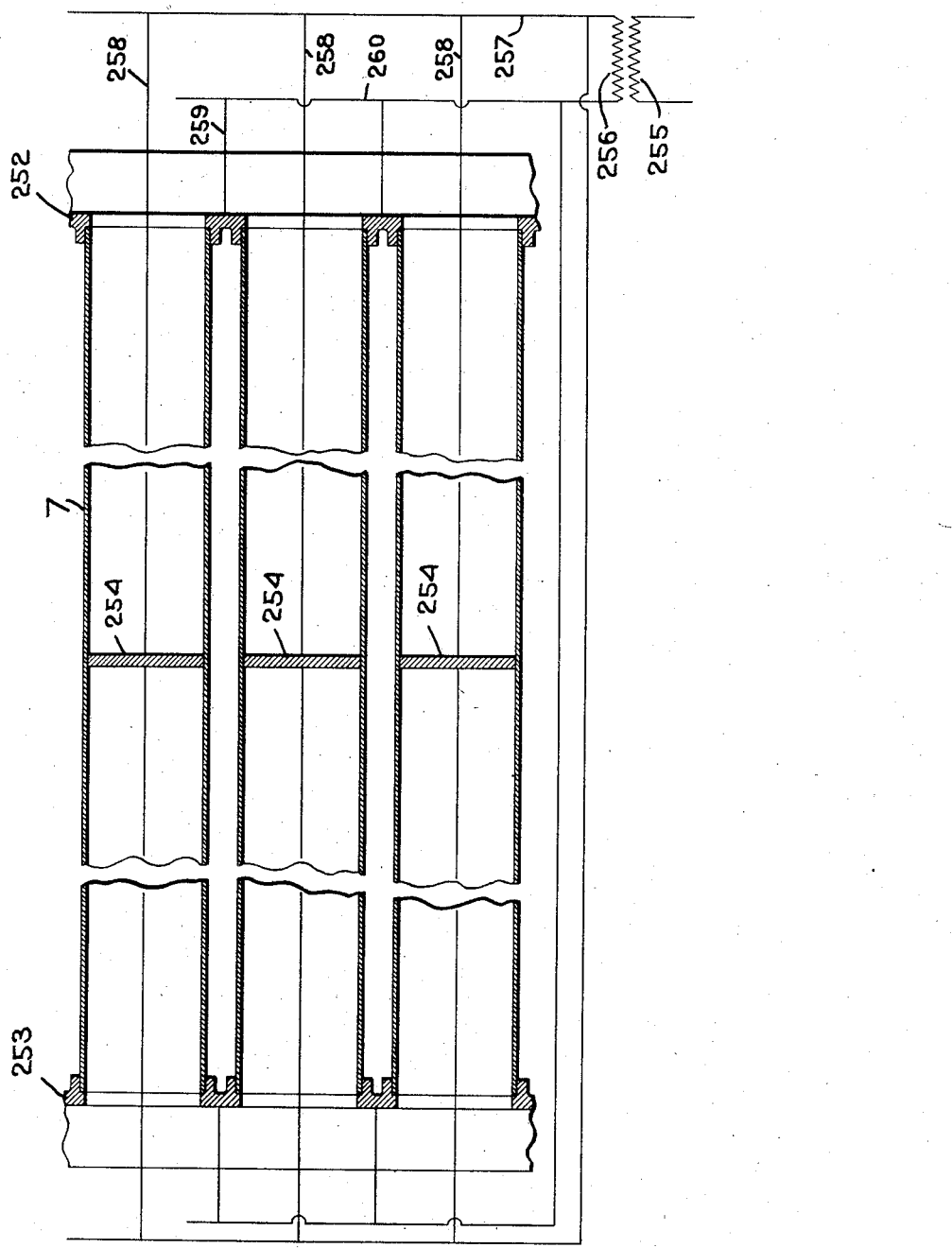

Patented Sept. 2, 1930

1,775,017

UNITED STATES PATENT OFFICE

ROBERT A. CARLETON, OF NEWTON CENTER, MASSACHUSETTS, ASSIGNOR TO NATIONAL ELECTRIC HEATING COMPANY, INC., OF NEW YORK, N. Y., A CORPORATION OF NEW JERSEY

ELECTRIC FLUID-HEATING APPARATUS

Application filed November 19, 1928. Serial No. 320,317.

This invention relates to improvements in electric fluid heaters and the object of the invention is to provide an improved apparatus for heating and/or evaporating fluids.

More particularly the invention relates to improvements in apparatus for heating fluids comprising substantially a vertically arranged heating means presenting a large surface area or areas, with means for electrically heating the same, and means for causing the fluid to be heated to flow or cascade over the surface or surfaces of said heating means preferably in the form of a thin sheet or film of fluid.

The term "cascade" is used herein to include means which will so interrupt the rate of flow of portions of the fluid of the flowing sheet as to cause all, or substantially all, of the fluid to flow in direct contact with some portion of the heating means, for example, the heating means preferably are so constructed as to avoid continuous contact of the same fluid forming the face of the sheet which is in contact with the heating means from maintaining such position throughout the whole or a greater portion of the time to which the fluid is subjected to heat, and to cause such disturbance in the sheet that the fluid forming, for example, part of the outer surface of the sheet, will be caused to come in contact with the heat radiating surface of the heating means.

Another object of the invention is to provide a plurality of vertically arranged heating means of high electrical resistance and presenting a large surface area, with means for causing an electric heating current to pass therethrough, and with means for causing the fluid to be heated to cascade over said heating means.

The present invention may be embodied in various forms of apparatus in which the vertically arranged heating means may be in the form of plates, or preferably has a vertical series of substantially horizontal, narrowly separated, tubular members having means for electrically heating the same, and means for causing the fluid to be heated to cascade over the surface of said tubular members.

In usual heating and evaporating apparatus comprising a vertical series of tubes heat has been supplied by passing steam through the tubes over which the fluid is caused to flow. The mechanical and structural features of such type of apparatus make it necessary to use relatively low pressure steam and due to the temperature drop, caused by heat transfer and other conditions, there is available between the heated surface and the material being heated but a relatively small temperature difference, making it necessary to employ apparatus having large heating surfaces and requiring a long interval of time to transmit the desired amount of heat from the steam used for heating to the fluid being heated.

This condition becomes more serious when such apparatus is used as an evaporating apparatus where the fluid to be evaporated has a relatively high boiling point and it is consequently necessary to raise it to a comparatively high temperature to effect vaporization.

The present invention provides means by which the fluid is caused to flow or cascade evenly, in the form of a film or thin sheet, over a series of tubes or plates which are electrically heated, and which by suitable thermostatically actuated electrical controlling mechanism may be automatically maintained at the desired temperature.

A further object of the present invention, therefore, is to provide an electrically heated apparatus having means for maintaining the heating members closely at any desired temperature.

A further object of the invention is to provide an electrically heated apparatus for heating and/or evaporating fluids in which the fluid, or its products, is or are in contact with the heated surface for a relatively short period of time and because of which higher heating temperatures may be employed without injury to the fluid, thereby permitting the heating or evaporating process to take place at greater speeds than have been attained in other heating or evaporating apparatus.

Another object of the invention is to provide an electrically heated apparatus of the type above mentioned, for heating and/or evaporating fluids, which may be so arranged that certain sections of the heating members may be operated at different determinate temperatures and provided with means for removing the vapor produced in each section.

Such apparatus is particularly adapted for fractional distillation of fluids composed of a number of compounds or elements having different boiling points.

Another object of the invention is to provide means for maintaining the heated surface or surfaces of each section at the definite determinate degree of heat required to cause the distillation from the fluid of certain definite vapors in each section, so that such vapors can be separately removed from the respective sections and condensed, or otherwise treated.

A further object of the invention is to provide a construction in which each section or zone may be under such different degrees of pressure of vacuum as may be required by the material being heated and evaporated, or by the results desired.

A further object of the invention is to provide an electrically heated fluid heating and/or evaporating apparatus in which the heating surface exposed to the flowing sheet or film of fluid to be heated is or may be progressively reduced to compensate for the diminution in the volume of the fluid due to evaporation.

In electrically heated apparatus of the type above described where heat is generated in or supplied to the heating members over the entire heating surface, interruption of flow of the liquid, or uneven flow of the liquid over the surface, would cause a greater generation of heat at certain portions of the surface than at others, thereby raising the temperature of the heating member at such points and causing a more rapid and uneven vaporization of the fluid. This condition would be cumulative until the temperature reached would be likely to damage the material being treated or to injure the apparatus.

A further object of the invention is to provide means for equalizing the temperature over the entire heated surface of each heating member. This is accomplished by circulating a body of fluid, such as oil, or other suitable medium, through the heating tubes, the circulating fluid thus acting to absorb heat from any portion of the heating surface that tends to become overheated and transfer the excess of heat to other portions of the heating members.

In apparatus of this type it is desirable to use a low potential difference between adjacent heating members to minimize the leakage, or the short circuiting of the electric current by the film or sheet of fluid flowing or cascading from tube to tube, particularly where the fluid to be heated is of low electrical resistance.

Another object of the invention is to provide means for overcoming such leakage, and also to provide means for neutralizing the inductive effect of the electric currents used so as to cause the apparatus to work at a high power factor.

In the preferred embodiments of the invention disclosed herein this is accomplished by maintaining adjacent heating units at substantially the same potential and by causing the electric current to flow in opposite directions in the closely adjacent heating members or closely arranged heating members and conductors of each heating unit, thereby neutralizing the effect of self-induction.

Another object of the invention is to provide an electrically heated fluid heating apparatus of the type above described, with means for subjecting the heated fluid delivered from the apparatus to the action of heat exchanging means adapted to subject the heated fluid to a radically different temperature.

The present invention is adapted to the employment either of cooling mechanism for treating the fluid, or to mechanism for supplying a high degree of heat to concentrate or to desiccate the fluid so delivered.

Such an adaptation of the apparatus is especially desirable for use in evaporating or concentrating fluids, such as sugar, fruit juices, milk, or other products, sensitive to or easily effected by elevated temperatures maintained for a considerable interval of time, as by the present invention the time during which the fluid is exposed to high temperature may be greatly reduced and a higher degree of heat may be safely utilized than that which has been heretofore employed, particularly where means are provided promptly to cool the heated liquid.

Apparatus embodying the present invention lends itself readily to such a construction by merely providing a vertical series of tubes below and in substantially the same plane as the heating tubes, so that the hot concentrated fluid will flow from the heating tubes over the outside of the cooling tubes, thus quickly reducing the temperature of the fluid to the desired degree.

Another feature of the invention consists in circulating the fluid to be heated through such heating tubes before it is caused to cascade over the heating members. Thus the fluid may be preheated in the cooling tubes and the amount of heat supplied through the heating members consequently reduced, thereby enabling the apparatus to operate at a higher economy.

Another object of the invention is to provide an apparatus for heating a cascading sheet of fluid comprising a vertical series of substantially horizontal, narrowly spaced, tubular heating members, each having a wall of high electrical resistance extending throughout the effective length thereof, with means for passing an electric heating current therethrough, and means for circulating a heat transferring fluid progressively through said tubular members.

Another object of the invention is to provide an apparatus of this type with thermostatic means subject to the temperature of the fluid which circulates through the heating members operable to control, and preferably to maintain constant, the temperature of said heating members.

Another object of the invention is to provide means controlled by the flow of the fluid to be heated which is delivered to the heating means, with means operable upon interruption or cessation of the flow of the fluid to be heated to cut off the current supplied to the electric heating means.

Another object of the invention is to provide an electric fluid heating apparatus of the type above described with novel heating means comprising superimposed, narrowly separated, tubular heating units having inner and outer concentric walls, one or both of which walls may be of high electrical resistance material, with novel means for circulating the heat transferring liquid through said tubular members, preferably in series.

By reason of such construction the outer wall of the tubular members may be made of high resistance material and the cascading fluid heated directly thereby, while the circulating fluid within the tubular member will maintain the surface of the heating member uniform throughout its entire length, or the outer wall of the tubular member may be of relatively low resistance and the inner wall or tube of high resistance and adapted to be electrically heated by the current and the heat radiated from the inner wall or tube transmitted uniformly to the outer wall by the liquid circulating through said tubular members between the inner and outer walls or tubes. The inner wall or tube may be perforated so that the liquid may circulate freely through the inner wall.

Another feature of construction consists in providing the electrically heated tubular members of the character above described with outer surfaces of non-corrosive material, or material which will not be affected by the character of the flowing material being heated or when subjected to high temperature.

A further object of the invention is to provide novel means for mounting the tubular heating members.

A further object of the invention is to provide means for permitting relative longitudinal expansion between the inner and outer tubular walls of said heating members, and a still further object of the invention is to provide means for insulating one of said tubular members or walls from the other in such a manner that the electric heating current may be passed through said walls or corresponding longitudinal sections thereof in opposite directions, thus to neutralize the effect of self-induction.

These and other objects and features of the invention will more fully appear from the following description and the accompanying drawings and will be particularly pointed out in the claims.

Illustrative embodiments of the invention, and adaptations of the invention for different uses, are shown in the accompanying drawings, in which, Fig. 1 is a view, partially in vertical section, but mainly in side elevation, of an electrical heating apparatus for heating and/or evaporizing fluids;

Fig. 2 is an enlarged transverse vertical sectional view of the apparatus shown in Fig. 1, the pump and motor being shown in elevation;

Fig. 3 is an enlarged detail view in longitudinal vertical section of certain of the series of heating members and illustrating the manner in which they are mounted and assembled to permit the circulation of the heat transferring fluid therethrough;

Fig. 4 is an enlarged detail end elevation of one of the tubular heating units;

Fig. 5 is an enlarged, transverse, vertical sectional view of one of the heating units showing the manner in which the inner and outer tubular members are maintained in properly separated relation;

Fig. 10 is a vertical transverse sectional view of the apparatus illustrated in Fig. 8;

Fig. 11 is an enlarged detail view, partially in vertical section of the lower portion of the apparatus illustrated in Figs. 1, 2, and 3, showing also a heat exchanging device for condensing the fluid delivered from the superimposed heating means or for desiccating the solid materials therein contained;

Fig. 12 is a transverse sectional view on line 12—12 Fig. 11;

Fig. 13 is a detail view of the means for permitting the agitators or scraper blades within the drum to yield;

Fig. 14 is a detail view illustrating the angular position of the agitators or scraper blades relatively to the longitudinal axis of the drum;

Fig. 15 is an elevation of a modified form of electrically heated fluid heating apparatus;

Fig. 16 is a transverse vertical sectional view of the heating unit illustrated in Fig. 15 on line 16—16 Fig. 15;

Fig. 17 is an enlarged horizontal sectional view on line 17—17 Fig. 15;

Fig. 18 is an enlarged longitudinal vertical sectional view of certain of a series of heating members of a modified form, and also illustrating a modified arrangement for circulating the heat transferring fluid therethrough;

Fig. 19 is a vertical sectional view of certain of a series of heating members illustrating another embodiment of the invention; and, Fig. 20 is a similar view illustrating another arrangement of the heating members.

Figure 6:
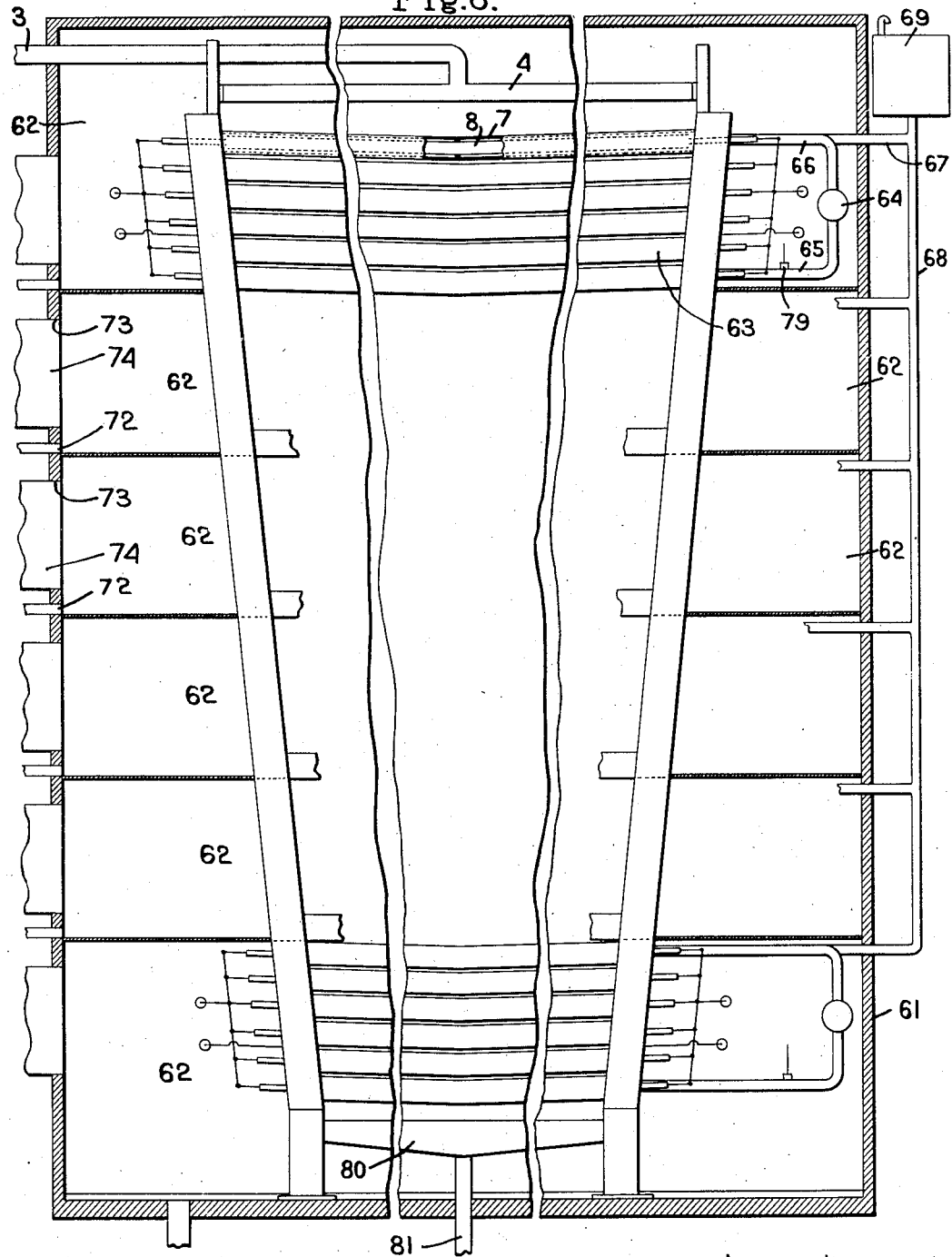
Fig. 6 is a view partially in vertical section, and partially in elevation and broken away, illustrating an embodiment of the invention adapted for progressive evaporization or distillation and the separate removal of the vapors produced from the fluid under treatment.

Various illustrative types of electrically heated heating apparatus for fluids embodying the invention are shown in the accompanying drawings for the purpose of disclosing the wide adaptation of the present invention and some of the various modifications in construction which may be made within the scope of the invention disclosed and claimed herein.

Among the important principles of the invention which are common to all of the embodiments of the invention illustrated herein comprise means for causing a thin sheet or film of the liquid, or other fluid to be treated, to flow in a thin sheet or cascade over substantially vertically arranged heating members presenting a relatively large surface area, with means for electrically heating said heating members, together with thermostatically operable means for controlling the electric current supplied to the heating members to maintain a predetermined, substantially uniform, temperature.

Another principle which is common to all of the types of apparatus illustrated herein comprises means for so conducting the heating current to the heating members that the current will pass through narrowly separated conductors, one or both of which may be heating units, in opposite directions, thereby partially or wholly neutralizing the effect of self-induction.

Another feature common to many embodiments of the invention comprises means for circulating a heat transferring fluid through tubular heating members and preferably progressively through a series of such members for the purpose of maintaining uniformity in temperature throughout the full length of the heating members and for the purpose of avoiding hot spots which would otherwise occur if the sheet of fluid cascading over the heating members were unevenly distributed. Thermostatic means preferably subject to the temperature of the circulating fluid is also employed to regulate the current delivered to the heating members. The thermostat may however be subject to the temperature of the high resistance heating member.

Another feature which is common to several of the said constructions comprises the association with the heating mechanism above described of heat-exchanging means adapted to subject the heated fluid to radically different temperatures, such as a cooling temperature on one hand, or a radically higher temperature on the other hand, adapted to reduce a concentrated liquid, produced by heating and evaporation in the foregoing apparatus, to a solid or substantially dry state.

Various forms of heating members have been illustrated which may be selectively employed in heating apparatus of the type above described in accordance with the character of the fluid to be treated or the character of apparatus required for the treatment thereof.

It will, therefore, be understood that in the following disclosure of the invention and description of such common principles and features of construction are applicable to the various illustrative types and are not restrictive to a particular embodiment of the invention.

A preferred form of apparatus, which is illustrated in Fig. 1, comprises a preferably rectangular chamber 1, of considerable height and narrow width, containing a vertical series of substantially horizontal, narrowly spaced, tubular heating members 2. The fluid to be heated may be supplied through an inlet pipe 3 to a horizontal distributing pipe 4 provided with suitable narrowly spaced orifices adapted to distribute the fluid uniformly over the surface of the uppermost of the tubular heating members 2 from which it will flow progressively downwardly over the other heating members and will be collected in a collecting trough 5 from which it may be removed through a discharge pipe 6.

The tubular heating members may be of equal length, but if temperatures are to be employed which will cause substantial evaporation of the fluid and thereby diminish the volume of fluid presented progressively to the heating members, the heating members 2 may be gradually shortened in length from the uppermost downwardly, as illustrated in Fig. 1, so that substantially the same thickness of the sheet of fluid will be maintained throughout the progress thereof over the heating members.

Any desired form of electrically heated tubular heating members may be employed. Preferably the heating members comprise outer and inner, substantially concentric, walls, either one or both of which may be formed of or comprise material of high electrical resistance and adapted to generate heat from the passage of an electric heating current therethrough.

A portion of a series of a preferred form of electric heating units or members is illustrated in Figs. 2, 3, 4 and 5, in which each tubular heating member comprises an outer wall or tube 7 and a concentrally arranged inner wall or tube 8 spaced apart from the outer wall or tube. Either or both of these members may be electrically heated. In the particular embodiment illustrated in Fig. 3 means are provided for heating the inner wall or tube of the tubular heating member, and means are provided for transferring the heat generated thereby to the outer wall or tube 7 over which the fluid to be heated is caused to cascade.

The outer tube or wall of the metallic heating member may if desired be provided with a suitable surface adapted to resist chemical or other action which otherwise might be caused by the heated fluid passing over it. Any such surface may be applied, either for example by metal plating 9, or by a coating of glass, porcelain, or other corrosion-resistant material. The means for transferring the heat generated in the inner tube and the outer tube desirably may comprise a suitable heat transferring fluid, preferably a liquid having a high temperature of vaporization as well as a high flash point temperature.

Means preferably are provided for causing the heat transferring fluid to flow progressively through the tubes of the series. In the particular embodiment of the invention shown in Figs. 1 to 3 the tubular heating members communicate with hollow headers 10 and 11 provided with partitions which cause the fluid to flow progressively through the several tubular heaters, preferably from the lowermost to the uppermost to which it is delivered. The headers 10 and 11 may be substantially identical in form and each comprises a standard or casting of substantially rectangular form adapted to support the tubular heating members and provided with inwardly extending circular bosses 12 adapted to receive the ends of the outer walls or tubes 7 of the heating members. Apertures 13 and 14 in the area enclosed by the flanges 12 of two adjacent heating members provide communication between such heating members and a chamber 15 in the header 10.

Partitions 16, extending transversely of the header, separate the chamber 15 from the next succeeding chamber 17 of the header which in turn communicates with the adjacent ends of two tubular members. The header 11 at the opposite end is of similar construction, but the partitions 18 are arranged between the heating tubes joined by the chamber 15 of the header first described, so that the chamber 19 of the header 11 communicates through the heating members with both the chambers 15 and 17.

Heat transferring fluid may be introduced from the expansion tank 20, located at a height to provide a proper head, through a pipe 21 into the upper most chamber of the header 10 from which it will flow alternately through the tubular heating members and chambers, of the headers 11 and 10 to the lowermost heating member from which it will be delivered through a pipe 22 to the inlet of a circulating pump 23 and from said pump through a return pipe 24 to the upper end of the header 10.

The lower ends of the headers 10 and 11 may be supported upon standards 25 of any suitable design and means may, of course, be made for retaining the vertical series of heating members in vertical position within the chamber. The headers may be arranged vertically, or when the apparatus is to be employed as an evaporating apparatus may be inclined upwardly and outwardly from the bottom, as illustrated in Fig. 1.

The chamber 1 may be provided with a suitable stack or outlet 26 to permit the escape of vapors from the fluid being heated, and means may, if desirable, be provided to collect, condense, or otherwise treat, the vapors so delivered, or vapors may be separately withdrawn from different sections of the chamber as will hereinafter more fully appear.

It has been mentioned that in the construction illustrated in Figs. 1 to 3, the inner wall or tube 8 of the tubular heating member comprises an electrically heated element, and means are provided for so supporting the inner tubular heating element which will permit longitudinal expansion thereof relatively to that of the outer wall 7 without imposing a strain upon the headers.

In the construction illustrated in Figs. 1 and 2 the inner tube 8 is supported in concentric relation to the outer tube 7 by a central metallic ring 27 forming an electric conductor establishing electrical connection between the inner tube 8 and the outer tube 7 for purposes which will hereinafter be more fully described. This ring is provided with apertures 28 of sufficient size to permit the heat transferring fluid to flow freely therethrough as it is circulated through the tubular heating members.

The inner tubes 8 are also supported by a plurality of spacing members 29 of insulating material which may be secured to the inner tube at suitable intervals before it is introduced into the outer tube.

The ends of the inner tube are provided respectively with metallic heads 30 and 31 preferably having apertures therethrough adapted to permit the heat transferring fluid to flow longitudinally through said inner tubes. The inner tubes may also be provided with apertures 32 at certain portions of or throughout their length to permit the circulating fluid to flow freely through any desired portion of all of the tubes. Such apertures may also be employed to reduce the cross sectional area of the metal of the inner tube and thereby increase its electrical resistance.

The heads 30 and 31 of the tubes have connected to them metal bars 33 and 34, of relatively low electrical resistance, which are slidably mounted in bearings 35 carried by insulated plates 36 which cover apertures 37 in the walls of the headers and are fixedly secured therein by externally screw threaded rings 38 engaging the countersunk walls of said apertures. Stuffing boxes 39, surrounding the rods 33 and 34, are screwed upon the bearings 35 and provided with a suitable packing to insure a fluid-tight joint.

Any suitable means may be provided for supplying a suitable heating current to the tubular heating members.

In the particular construction illustrated in Figs. 1 and 2, a three-phase alternating current, which may be of high tension, is supplied through conductors 40, 41, and 42, to the primary 43 of a step-down transformer, and a heating current of relatively low voltage and high amperage is transmitted from the secondary 44 of said transformer through a conductor 45 to a common bus-bar or conductor 46 which is connected in multiple to the bars 33 which extend from the same end of the tubes 8.

The heating current is also transmitted through a conductor 47 from the opposite end of the transformer to a bus-bar or conductor 48 which is connected to all of the bars 34 at the opposite ends of the tubes 8. The return conductors 49 and 50 are connected respectively to the headers 10 and 11 which lead to the center of the transformer and desirably are also grounded by a conductor 51.

In the operation of the device the phase of the heating current which passes through the conductor 49 is distributed by the bus-bar 46 to the bars 33 of all the inner tubes and passes thence through the tubes to the inner tubes 8 of the heating members to the central ring 27, and from the central ring 27 through the outer conductor tube 7 to the header 10 from which it returns to the transformer through the conductor 49. Likewise the phase of the heating current which passes from the opposite end of the transformer through the conductor 47 is distributed by the bus-bar 48 to the rods 34 at the opposite ends of the tubes 8, and flows through the tube 8 to the central ring 27, thence through the outer tube 7 of the heating member to the header 11, and returns through the conductor 20 to the central portion of the transformer.

By reason of this construction the current passes inwardly from the end of the inner tube or wall 8 of the heating member to its longitudinal center, thence through the ring 27 and outwardly through the outer tube or wall 7 of the heating member. The current, therefore, flows through each section of the tube 8 from the end to the center thereof in the opposite direction to that in which it flows through the outer tube or wall 7 of the heating member, and by reason of the proximity of the inner and outer heating members, the current thus flowing in opposite directions neutralizes, to a great extent, the effect of self-induction.

Any suitable means may be provided for regulating the current which is supplied to the heating members. Desirably a thermostatic device comprising a bulb containing an expansible fluid or gas is located in the circulating stream of the heat transferring fluid and connected by a tube 53 to an expansible bellows having means for actuating an electric control switch 54 of a voltage regulator 55 for the primary coil of the step-down transformer 43. The thermostatic device 52 will, therefore, control the current supplied to the secondary of the transformer in such a manner as to maintain the heat generated in the tubular heating members at the desired temperature. Obviously the thermostat may, if desired, be so positioned as to be subject to the heat of the high resistance heating member or to the temperature of the heated fluid.

Desirably means are provided to prevent overheating of the tubular members in the event of interruption or cessation of the supply of fluid to be heated. In the construction illustrated in Fig. 1 the inlet pipe 3 is provided with a pivotally mounted switch 56 which is operated hydraulically by the fluid flowing through the pipe 3 to complete the circuit of a branch or shunt 57 and 58 of the main power supplying circuit through a contact breaking device 59 in the conductors leading to the primary. This construction is such that when liquid is being supplied through the pipe 3 to the heating apparatus the branch circuit 57 and 58 will be completed, thereby causing the contactor 58 to close the circuit to the primary of the transformer. Upon cessation of flow through the inlet pipe 3 the branch circuit 57 and 58 will be broken, the contactor opened, thus breaking the primary circuit, and consequently de-energizing the transformer so that no current will flow to the heating members.

In the operation of the device the fluid to be heated is introduced through the pipe 3 and is distributed by the perforated pipe 4 upon the uppermost heating member 7 and thereupon formed into a thin sheet or film which flows downwardly therefrom and cascades in the form of a thin sheet over the other tubular heating members of the series, or, being projected upon the uppermost heating member in the vertical axial plane thereof, is divided into two sheets or films which cascade over the other heating members.

Where the apparatus is used for evaporating liquids the volume of the liquid will decrease as it progresses downwardly and in such case the tubular heating members are made successively shorter from the top toward the bottom. In such case deflecting plates or vanes 60 are provided adjacent the ends of the tubes to direct the fluid to be heated inwardly as it flows from one tube to the next beneath it and thereby to prevent the fluid from flowing upon the converging walls of the headers 10 and 11.

Heat is produced in the tubular heating members by the electric current passing through the high resistant walls of the heating members and it will be obvious that either the inner tube, as illustrated herein, or the outer tube, or both tubes, or walls of the tubular heaters, may consist of or comprise material of high electrical resistance. Where the inner tube comprises the high electrical resistance material heat is transmitted from the wall of such tube to the outer tubular member by the liquid which is circulated through the tubular members, and the circulating liquid not only serves to transfer the heat from the inner tube to the outer tube, but also to equalize the heat transferred throughout the length of the tube. Furthermore, this circulating fluid prevents the production of hot spots upon the tubular heating members which might otherwise occur by reason of interruption or uneven flow of the fluid to be heated over the heating members.

The electric current passes through the inner and outer tubes or walls of the tubular heating members in opposite directions and thus tends to and does substantially neutralize the effect of self-induction. Furthermore, the electric current passes through the outer tubes or sections thereof in the same direction and at substantially the same voltage, so that the leakage or short circuiting of the electric current by the film or sheet of fluid flowing from tube to tube is practically eliminated.

The tubes are maintained substantially uniform at a predetermined temperature by the action of the thermostat which is subject to the temperature of the circulating fluid or to the temperature of the heating member, and protection of the apparatus against overheating is provided by the flow control which is arranged to cut out the supply of electric current upon interruption or cessation of flow from the supply of fluid to be heated.

The above description of the construction and operation of the heating apparatus is common to all of the constructions illustrated herein which embody tubular heaters with the exception that in certain of the heaters all of the tubular heating members of a series are of equal length.

Figure 7:
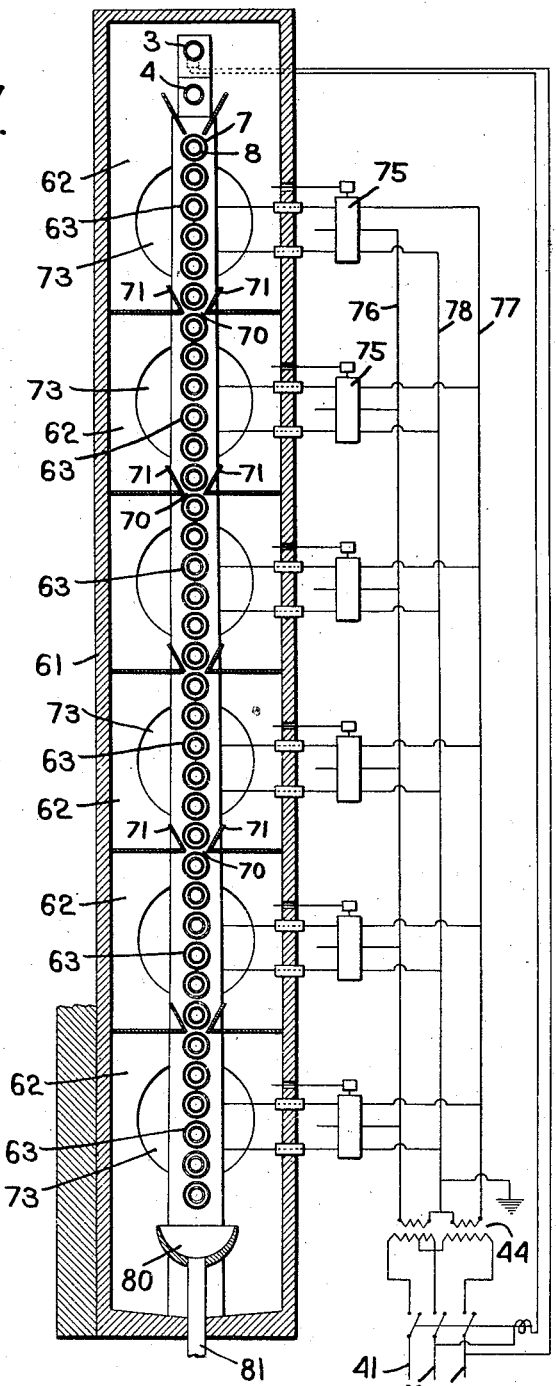
Fig. 7 is a transverse vertical sectional view of the apparatus illustrated in Fig. 6.

In Figs. 6 and 7 an embodiment of the invention is illustrated which is particularly adapted to fractional distillation of liquids and the removal and recovery of vapors distilled from the liquid at different temperatures. This construction comprises a preferably narrow vertical rectangular closed casing 61 having partitions extending longitudinally thereof dividing the casing into a plurality of chambers 62. Each of these chambers contains a separate series 63 of tubular heating units. The tubular heaters of each series comprises an inner tube or wall 8 and an outer tube or wall 7 concentrically arranged and preferably constructed as above described in connection with Figs. 1 and 2, and the tubular heating members of each series may be progressively shorter from the uppermost to the lowermost, and each series progressively shorter than the series next above it.

In such apparatus where the volume of the fluid being heated rapidly reduces, the tubular heating members may be bent downwardly toward the middle so that the sheet of fluid cascading over one heating member to the next beneath it will tend to flow toward the vertical transverse central plane of the heating apparatus and thus maintain a sheet of fluid of substantially the same thickness.

The heating units or series of tubular heating members of each section are provided with a separate system for circulating a heat transferring fluid, this system comprising a pump 64 having its lower end connected to a pipe 65 leading from the lower end of the header of the series, and an inlet pipe 66 leading to the upper end of the header, and a supply pipe 67 leading from a manifold 68 to the upper chamber of the header, the manifold being supplied by heat transferring fluid from a reservoir or expansion tank 69.

The fluid to be heated is introduced through an inlet pipe 3 which leads to a perforated distributing pipe 4 which delivers the fluid to be heated upon the uppermost tubular heating member of the upper series. The fluid thus delivered cascades over the heating members of the upper series 63 and flows from the lowermost tubular heating member of this upper series to the uppermost heating member of the chamber next beneath it.

In order to permit the fluid to pass in sheet form from one series of heating members to another the partitions which separate the series are provided with passages or slots 70 leading from one chamber to the other, and downwardly converging guide plates 71 leading to the aperture 70 serve to direct the flowing fluid to the series of heating units of the next lower chamber, and also to prevent the flow of any liquid resulting from condensation within the chamber to the next succeeding chamber. Pipes 72 communicating with the respective chambers 62 may be provided for the purpose of drawing off such condensates.

Suitable apertures 73 leading through the walls of the casing and communicating with the respective chambers are provided to receive pipes 74 through which the vapors distilled in the respective chambers may be separately withdrawn and subsequently condensed or otherwise treated by apparatus not shown.

Where fractional distillation of liquids is produced means are provided to subject the liquid to different temperatures in the different chambers of the apparatus and this is accomplished by providing each heating unit or series of tubular heating members with separate means for controlling the current supplied to the heating members of that series, such as a voltage regulator 75 which is placed in the branch circuit which leads to such series over the common conductors 76, 77, and 78, which delivers the heating current from the secondary 44 of the transformer which is supplied from the service lines 40, 41, and 42 as above described.

The circulating system for the heat transferring fluid of each of the heating units desirably is provided with a thermostatic device 79 which may be similar to the thermostatic device 52 above described operable to control the voltage regulator 75, and such thermostatic devices may be set to maintain in the several chambers the different, but substantially uniform temperatures required to distil from the fluid being treated the desired vapor or vapors which may then be drawn off by vacuum, applied to the chamber through the discharge pipe 74, or otherwise.

In this construction, as in that previously described, the residue of the fluid being treated is collected in a trough 80 at the lower end of the lowermost series and delivered therefrom through an outlet pipe 81.

Figure 8:
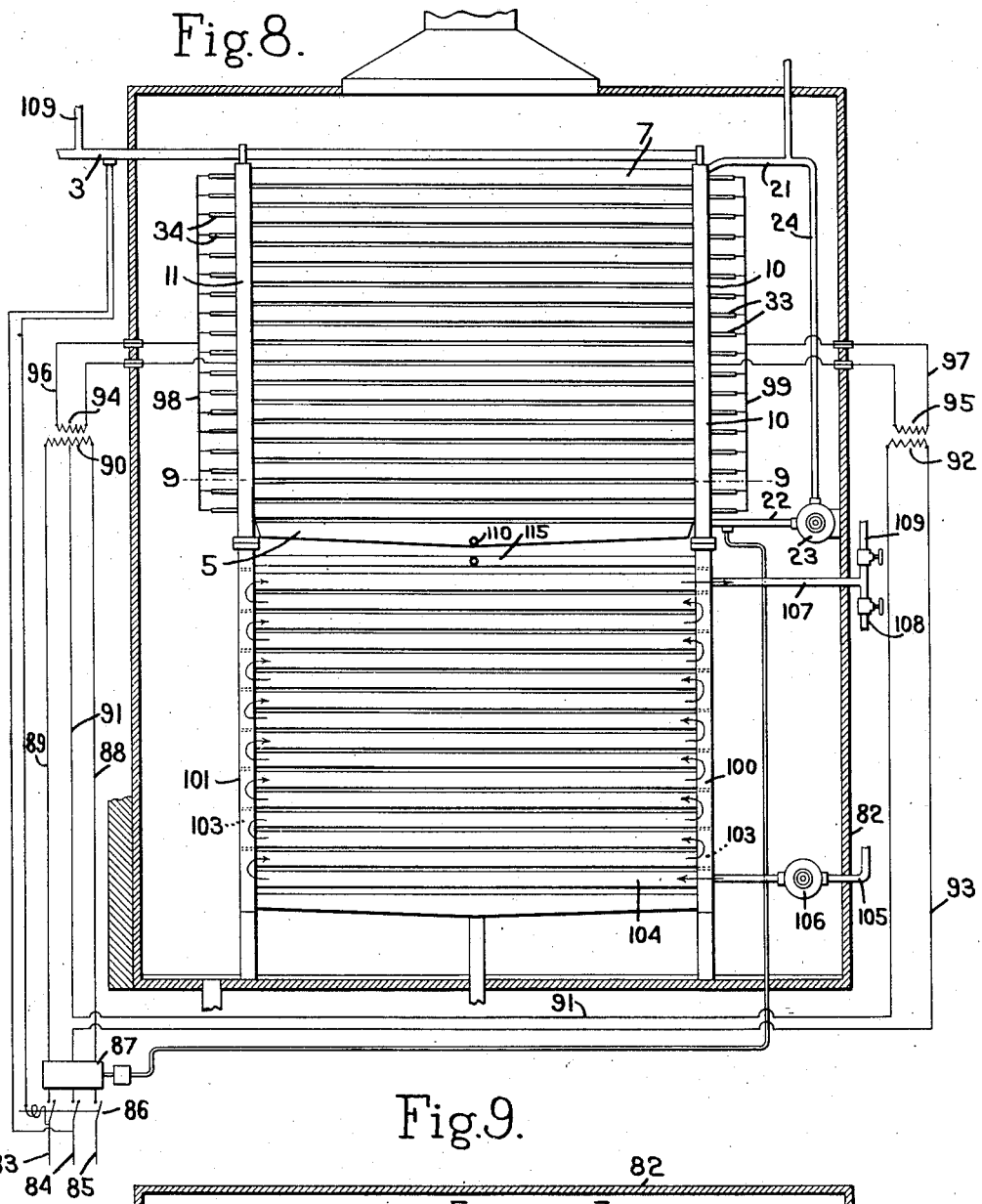
Fig. 8 is a view, partially in section, but mainly in elevation, of an apparatus embodying the invention particularly adapted for heating a fluid, in combination with heat exchanging means adapted to subject the heated fluid to a radically different temperature.
Figure 9:
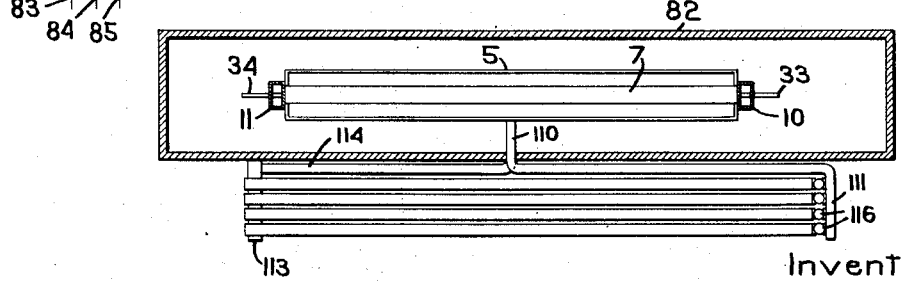
Fig. 9 is a horizontal sectional view on line 9—9 Fig. 8, viewed downwardly.

In Figs. 8, 9, and 10 of the drawings another embodiment of the invention is illustrated which is particularly adapted for heating, evaporating or concentrating fluids, such as sugar, fruit juices, milk, or other products, sensitive to or easily affected by higher temperatures. In most of such materials the alteration or injurious effect is caused by the excessive time interval to which the material is subjected to high temperature and if the time interval is sufficiently reduced such high temperature or even higher temperatures, may be safely utilized.

In the construction disclosed in Fig. 8 the time during which the fluid being treated is exposed to the heated surface is very short, being the time required for the fluid to flow or cascade from the upper to the lower tubular heating members and the heated fluid may then be passed to a heat-exchanging device where the fluid will be subjected to radically different temperatures than that produced by the heating mechanism.

In heat treating milk, oils, and certain other fluids it is frequently desirable to maintain the heated fluid at a definite degree of temperature for a determinate period of time for the desired reaction to take place and then in order to terminate such reaction to cool the fluid quickly.

The invention illustrated in Figs. 8, 9, and 10, also comprises means for causing the heated fluid to pass slowly through a reaction chamber which may be so designed or adjusted to allow any desired interval of time for the fluid to pass therethrough after which it may be delivered to and treated by a suitable heat-exchanging apparatus.

Where rapid evaporation is required the interior of the chamber may be placed under vacuum, thereby increasing the rapidity of vaporization of the volatile contents of the fluid. The construction illustrated in Figs. 8, 9, and 10, comprises a preferably narrow vertical casing 82, like that above described, providing a chamber for the heating apparatus. The heating apparatus may be and preferably is similar to that disclosed in connection with Fig. 1 and comprises a vertical series of tubular heating members having inner walls 8 and outer walls 7, one or both of which are of high resistance material and supported upon headers 10 and 11 as heretofore described.

The electric heating current may be supplied to the tubular heating members in the manner heretofore described with respect to the preceding figures. As illustrated, however, a slightly modified mechanism is provided for supplying the electric current in which a three-phase power current is led in through conductors 83, 84, and 85, to a magnetic switch 86 which leads to a voltage regulator 87 and from said voltage regulator through conductors 88 and 89 to the primary 90 of a transformer, and from the primary 90 of the transformer through the return conductor 91 to another transformer 92 and thence through a return conductor 93 to the voltage regulator.

The secondaries 94 and 95 of these transformers are connected respectively by conductors 96 and 97 to bus-bars 98 and 99 which have branches connected to the ends of the rods 33 and 34 respectively of the inner tube of the heating members as described in connection with Fig. 1. The outer tubes of the heating members are connected at their central portions in the manner described with respect to Figs. 2, 3, and 4, and the outer conductors are electrically connected to the headers 10 and 11 as heretofore described.

Means may also be provided for circulating a heat transferring fluid from a suitable reservoir through the pipes 21, thence through the tubular heating members to the outlet pipe 22 which leads to the circulating pump 23 and thence through the return pipe 24 to the uppermost chamber of the header as heretofore described.

The construction illustrated in Fig. 8 differs from previous constructions heretofore described in that the tubular heating members are illustrated as of equal length. The material to be heated is supplied through the inlet pipe 3 which is shown herein as provided with perforations adapted to distribute the fluid uniformly over the uppermost tubular heating member 7 of the series from which it cascades progressively downwardly over the other tubular heating members of the series and is collected in a trough 5 located beneath the lowermost of the series in the manner heretofore described.

In the construction illustrated in Figs. 8, 9, and 10, the headers 10 and 11 are mounted upon and supported by headers 100 and 101 having respectively chambers 102 and 103 communicating alternately with horizontal tubes 104 to provide a sinuous passage for a circulating cooling fluid. A circulating fluid may be supplied to the inlet pipe 105 of a pump 106 which communicates with the lowermost chamber of the header 100 and the fluid is then forced by the pump longitudinally through the series of tubes 104 from end to end and discharged through the outlet pipe 107 from which it may be discharged through a branch 108 to a heat absorbing apparatus not shown.

Preferably, however, the cooling mechanism may be employed to pre-heat the fluid which is to be treated. In such case the fluid to be heated, which is discharged through the outlet pipe 107, may be conducted by a branch 109 thereof to the inlet end of the fluid supply pipe 3. The pipe 109 is broken off, but it will be readily understood that it may be made continuous from the pipe 107 to the pipe 109. In such case a sufficient amount of fluid to be treated would be supplied to the inlet pipe 105 of the circulating pump.

In the apparatus shown in Figs. 8, 9, and 10, means are provided for selectively transmitting the fluid after it has been heated either directly to a heat-exchanging apparatus for the purpose of subjecting the same to a radically different temperature, or for retarding the flow of the heated fluid before it is subjected to the heat-exchanging device a sufficient time to permit the desired reactions to take place.

In the particular embodiment of the invention shown in Figs. 8, 9, and 10, the heated fluid which is collected by the trough 5 is delivered through a pipe 110 which may if desired extend through the wall of the casing to a header 111 which communicates with a plurality of parallel pipes or conduits 112. These pipes or conduits communicate at their opposite ends with a common pipe or header 113 which leads to a delivery pipe 114 which in turn communicates with a perforated distributor pipe 115 located in the vertical plane of the cooling tubes 104 of the heat-exchanging mechanism. The pipes 112 are each provided adjacent the header 111 with valves 116 and the pipe 110 desirably also is provided with a short branch, controlled by a valve 117, leading directly to the distributor pipe 115, in order that the material being heated may, if desired, be delivered directly to the distributing pipe 115.

By providing a suitable number of pipes 112 and selectively controlling the flow of fluid therethrough the interval of time required for the fluid to flow from the trough 5 through the pipe 110, the multiple pipes 112 and the pipe 114 to the distributing pipe 115, may be varied as desired, for it will be obvious that the rate of flow of the fluid from the pipe 110 to the pipe 114 will vary in direct proportion to the number of pipes 112 through which the fluid is transmitted from the pipe 110 to the pipe 114, that is to say, that if but one of the pipes 112 is used the rate of flow of the fluid from the header 111 to 113 will be the same as the rate of flow through the pipe 110. If, for example, four pipes 112 of equal capacity communicate with the header 111 the fluid will take approximately four times as long to flow through these four pipes to the pipe 114; therefore, the time interval will be substantially four times as great as before.

By regulating the number of pipes 112, through which the fluid is to flow, by setting the valves 116, a desired time interval may be given to the heated fluid to complete the proper reaction, after which the fluid will be immediately subjected to a radically different temperature as it passes over the tubes of the heat-exchanging device.

It will be apparent that the heating tubes may be progressively shorter from the uppermost to the lowermost as heretofore described and that other mechanisms above described in connection with the heating apparatus may be utilized in the construction illustrated in Figs. 8, 9, and 10.

Obviously other types of heat-exchanging apparatus may be provided to treat the fluid heated in the manner above described and that the heat-exchanging apparatus instead of being a cooling apparatus may be of a character to subject the heated fluid to a still higher temperature or temperatures for the purpose of concentrating the fluid or for the purpose of desiccating solid constituents of the fluid.

An illustrative apparatus for subjecting the fluid, delivered from the heating apparatus heretofore described, to higher temperatures is illustrated in Figs. 11 to 14 inclusive of the drawings. In this construction the fluid heating apparatus preferably is similar to that illustrated in Fig. 1 comprising a series of superimposed tubular heating members having outer and inner concentric tubes 7 and 8 carried by headers 10 and 11 in which the ends of the outer tubes 7 are mounted, with rods 33 and 34 extending from the heads of the inner tubes through the headers, together with means for supplying an electric current through bus-bars 46 and 48 to the rods 33 and 34.

In this construction the heated sheet of fluid, which flows from the lowermost tubular heating member, is collected in an inclined trough 118 from which it runs through a pipe 119 to a hopper 120 carried by a bracket 121 mounted upon a boss or girder 122 carried by the standards 25. A pipe 123 leads from the lower end of the hopper 120 through the tubular trunnion 124 and delivers the liquid to the chamber of a preferably inclined heating drum 125 in which it is subjected to a high temperature and delivered from the other end of the drum in condensed form or in a relatively dry condition.

The heating drum as illustrated comprises an inner wall or tube 126 of metal having high electrical resistance, such as Monel metal, or other material heretofore described, and an outer wall or tube 127 of a metal having a relatively low electrical resistance, the space between the inner and outer walls 126 and 127 being filled with an insulating material 128 resistant both to the passage of the electric current and to the conduction of heat. The head 129 at the inlet end of the cylinder desirably is of metal and electrically connected to the inner and outer walls 126 and 127 of the cylinder. As illustrated, it is provided with an inwardly extending boss 130 having a series of ports 131 with which the pipe 123 communicates. It is also provided with a series of apertures 132 adapted to permit the escape of vapors from the fluid heated in the drum. The boss 130 is also provided at its inner end with an extension forming a bearing 133 for the shaft of an agitating device which will hereinafter be described.

The head 134 at the outlet end of the drum desirably is of metal and electrically connected to the inner wall 126 and is provided with a plurality of discharge apertures 135 from which the material is discharged to a hopper 136 leading from the casing of the heater or to a suitable receptacle. The head 134 is connected both physically and electrically to a tubular trunnion 137 which desirably extends through the wall 1 of the casing and is journalled in a suitable bearing 138 upon a standard 139.

Any suitable means may be provided for rotating the drum. As illustrated herein the trunnion 137 is provided with a gear 140 which meshes with a pinion 141 upon the shaft 142 of an electric motor 143 which is mounted upon the standard 139. A plurality of collector rings 144, 145, 146, and 147, are mounted upon the trunnion 135 of the drum.

The outer wall 127 of the drum is electrically insulated at the outlet end of the drum from the head 124. As illustrated herein this is accomplished by providing flanges 148 and 149 upon adjacent sections of the outer wall and interposing therebetween a ring 150 of insulating material. Suitable insulated devices (not shown) clamp the flanges 148 and 149 together with the insulating ring 150 therebetween. An electric heating current is supplied to the drum in such a manner as to cause it to flow in opposite directions through the outer and inner walls of the drum, thereby overcoming the effect of self-induction as heretofore described.

In the construction illustrated a high tension current is supplied from a suitable source through conductors 151 and 152 to the primary 153 of a step-down transformer and a relatively low tension heating current is delivered from the secondary 154 thereof to the collector rings 144 and 145. The collector ring 144 is electrically connected to the trunnion 137 of the discharge end of the drum and transmits the current directly to the inner wall or heating element 126 of the drum. The current passes longitudinally through the inner wall, thence through the head 129 to the outer low resistance wall 127 of the drum from which it passes through a conductor 155 which may be connected to the flange 148. The conductor 155 desirably leads through an aperture having an insulated wall 156 to the interior of the trunnion 137, along the trunnion, and thence through an aperture having an insulated wall, to the collector ring 145 to the secondary of the transformer.

Desirably suitable thermostatic means are provided for controlling the current supplied to the heating wall of the drum. Such thermostatic means desirably is so arranged as to be subject to the temperature of the heating member or element of the drum.

In the embodiment of the invention illustrated an electrically operable thermostat 157 is located in contact with the inner wall of the drum and an insulated double conductor 158 leads therefrom through the trunnion 136 and the respective ends thereof are connected to the collector rings 146 and 147. Suitable conductors 159 and 160, connected by brushes with the collector rings 146 and 147, serve to supply current to the thermostatic circuit and to a voltage regulator 161 adapted, under the control of the thermostat, to regulate the current supplied to the primary 153 of the step-down transformer.

By reason of this construction the temperature of the inner wall or tube of the heating drum may be accurately controlled and any desired temperature maintained.

Desirably agitators are provided within the drum to cause a continuous stirring up of the material passing through it, and also to aid in producing a uniform and more rapid progression of the material through the drum. In the preferred construction illustrated such agitators are in the form of blades or scrapers 162 carried respectively at the lower ends of arms 163 and desirably arranged at such angle to the axis of the drum as will cause the progression of the material therethrough at a predetermined desired rate. The upper ends of the arms 163 desirably are provided with enlarged bosses 164 which are respectively connected to short shaft sections 165 having at their opposite ends flanges 166 and 167 which are clamped together with insulation 168 therebetween for the purpose of electrically insulating the several scrapers or agitators from each other.

The shaft sections are arranged in axial alinement and the sections at the ends provided with offset extensions 169 and 170 which are respectively journalled in bearings in alinement with the axis of the drum. As illustrated, the offset end 169 of the shaft engages the bearing 133 in the boss 130 of the head 129 at the inlet end of the drum. The offset portion 170 of the opposite end of the shaft extends longitudinally through the trunnion 137 and is journalled in a bearing 171 in a standard 172.

Means desirably are provided to cause the agitators or scrapers to maintain an even and determinate pressure upon the inner surface of the cylinder and also to yield to any obstruction which may be encountered. In the present construction the offset portion 170 of the shaft is provided with an arm 173 which is connected by a spiral spring 174 with an arm or extension 175 upon the standard 172. An adjusting bolt 176 is adjustably mounted in the arm 173 and at its lower end engages a shoulder 177 on the arm 175. A suitable lock nut or nuts may be provided for holding the bolt 176 in adjusted position.

As the end portions of the agitator shaft, which are journalled in bearings axially of the drum, are offset from the main portion of the agitator shaft, the agitator blades will be held yieldingly against the inner surface of the drum at a predetermined pressure which may be determined by the tension of the spring 174 and the adjustment of the bolt 176. Obviously if any obstruction is encountered by the agitator or scraper blades, the spring 174 will yield and permit the shaft to rotate sufficiently for the scrapers to clear the obstruction.

The main portion of the shaft within the drum is made in sections insulated from each other in order to insulate the shaft from its trunnions and to prevent leakage of an electric current from point to point along the inner wall of the cylinder, or from said inner wall to the cylinder heads 129 and 134.

By reason of the construction above described the sheet of heated and partially condensed fluid, which is delivered from the cascading heater to the trough 118, is passed through a highly heated drum which may be maintained at such desired temperature as either further to evaporate the fluid, or by expelling substantially all of the vaporizable material therefrom to desiccate the solid constituents thereof.

A modified form of the invention is illustrated in Figs. 15, 16, and 17, which is suitable to produce a more rapid heating or vaporization in a simple and efficient manner. In this construction the heating elements or surfaces are in the form of plates or sheets of metal having relatively high electrical resistance and are heated by passing a low potential current of high amperage through the plates.

In passing the body of fluid to be heated over such heating plates in the form of a sheet, the tendency is to form a film or layer next to the plate which becomes highly heated so that the outer portion of the sheet is heated by conduction through it. To overcome this condition a series of ripples or corrugations are provided to break up and mix the fluid of the sheet as it is passing over the heated surface, or in other words to cause it to cascade in the manner above explained.

In this construction, as in those previously described, the electric circuit is so arranged that the flow of current in the conductors supplying the current to the heater plate will be in a direction opposite to the flow of current through the plate, thus neutralizing the effects of self-induction of the relatively large low voltage current and enabling the electric circuit to operate in the most efficient manner and at a high power factor.

In the construction illustrated in Figs. 15, 16, and 17, the heater, which may be enclosed in a suitable casing (not shown) is formed of preferably channel bar construction having an upper channel bar 178 and a lower channel bar 179, end channel bars 180 and 181, (see Fig. 12) and a series of intermediate channel bar girders 182, the vertical channel bars being connected at their ends by welding or otherwise to the horizontal channel bars 180 and 181. This skeleton frame is covered by a metallic plate or sheet 183 which is a good conductor for the electric current and the sheet 183 is covered by a sheet of insulating material 184, such as mica. The heating elements which comprise sheets or plates 185 of high electrical resistance material, such as Monel metal, nickel-chrome steel, or other metal having the required characteristics for use as an electrical resistor, cover the surface of the insulating material. The sheets forming the heating elements are electrically and mechanically connected at their upper ends to the supporting structure and also may be connected by curved converging plates 186 which serve as guides to direct the fluid uniformly over the surface of the sheet.

In order to prevent buckling or distortion of the heater plates 185, tie rods, or other suitable connecting members 187 connecting the sheets 184 upon opposite sides of the frame, are provided. The plates 183 are provided with apertures 188 through which these tie rods extend so that the tie rods are insulated from the plates 183.

The heating plates 185 extend below the lower channel bar 179 of the frame and desirably are connected together by a semi-circular metal sheet 189, the edges of which are overlapped by the lower ends of the high resistance sheets 185. Bus-bars 190, which engage the inner faces of the high resistance sheets 185, extend longitudinally of the lower end of the heater and project at one end to form a terminal for the electric circuit. These bus-bars are supported by a central supporting member or filling plate 192 which is electrically insulated from the bus-bars by sheets of insulation 193 and also by an insulating bushing 194 which surrounds a screw 195 which connects the bus-bars 190 both mechanically and electrically.

The upper end of the supporting or filling plate 192, which lies below the lower channel member of the channel bar 179, is connected to bus-bars 196, the ends of which project beyond the end of the frame to provide a terminal for the electric current and which extend longitudinally throughout the entire length of the heater in contact with the inner faces of the conductor plates 183. Suitable screws 197, or other fastening devices, connect the bus-bars 196 together and to the supporting or filling plate 192, but the heads of these screws are electrically insulated from the heating plates by the sheet of insulation 184.

In order to prevent the fluid from flowing into the space formed at the ends of the separated heater plates 185 insulating ends are provided. These ends comprise a vertical bar 198 of porcelain, bakelite, or other suitable insulating material, which fits between the edges of the heater plates 185 and desirably has a rib or projection 199 extending into the channel of the vertical end channel bars 180 and 181 of the frame. Other covering plates or bars 200 of insulating material, which have recesses to receive the ends of the heating plates 185 and project a considerable distance laterally therefrom, are secured to the vertical channel bars by bolts 201 and serve not only to prevent the fluid from flowing into the spaces between the heater plates, but also form guides for the edges of the stream of fluid which flows over the heater plates.

In the construction illustrated distributing pipes 202 and 203 extend longitudinally of the upper end of the frame and are provided with closely arranged apertures 204 adapted to deliver fluid upon the distributing plates 186 from which the fluid flows over the surfaces of the heater plates 185 in a thin sheet. Desirably the surfaces of the heater plates 185 are provided at intervals with horizontal ribs or corrugations 205 which interrupt the progress of the film of the sheet of fluid which lies against the heater plate, thereby causing such agitation or cascading of the fluid that substantially all of the fluid will come directly in contact with the heater plates during its progress thereover.

A suitable trough 206 having an outlet pipe 207 may be provided beneath the lower end of the heater to receive the fluid which flows from the lower ends of the heater plates.

Any suitable means may be provided for supporting the heater in vertical position. In the construction illustrated brackets 208 having laterally extending flanges 209 are connected to the upper channel bar 178 of the frame and these brackets are bolted, or otherwise secured, to an insulating block 210 which in turn is connected to a suitable support 211.

In the operation of the device an electric current, preferably of low voltage and of high amperage, is supplied through the conductor bars 190 and 196. These conductor bars desirably are of rectangular form and tapered in cross section from the exposed terminals thereof to the opposite ends so that substantially the same current is delivered to the high resistance sheets at the same voltage throughout the entire width of the lower end of said sheets. The electric current flowing in through the conductor 190 passes directly to the external high resistance sheet 185 from the lower to the upper end thereof, and thence passes through the plates 186, the frame and inner conducting plates 183 to the bus-bars 196 from which it returns to its source.

Any suitable means may be provided for supplying this current such as those heretofore described and illustration thereof is, therefore, believed not to be necessary. This form of heating apparatus may be provided with means for controlling the current supplied to the heating members as heretofore described, preferably operable by a thermostat subject to the temperature of the heating members, as indicated. A circuit breaker controlled by the flow of fluid supplied may also be employed as heretofore described.

Obviously this type of heating apparatus may be utilized as an alternative construction to those heretofore described under such conditions as may be desirable, or in which it may be found to be more efficient.

It has heretofore been mentioned that other methods may be employed for assembling the heating tubes 7 and 8 and for so connecting the electric circuit to the tubes as to obtain substantial neutralization of the magnetic effect of self-induction and a condition of equal potential between adjacent surfaces of the tubular members.

Other means may also be employed to permit relative movement of the various members of the assemblage to provide for the different expansions of the heating members when subjected to different temperatures or one of different coefficients of expansion.

An assemblage of this character, which is particularly adapted for use under high temperatures, is illustrated in Fig. 18 in which the construction is so designed that the heat transferring fluid flows progressively through inner and outer tubes from the lower end of the series to the upper end thereof. In this construction means are provided for supplying the electric current to the tubular heating members in such a manner that the current flows in opposite directions in the outer and inner tubes, thereby substantially neutralizing the effect of self-induction as heretofore described.

In the construction illustrated in Fig. 18 the outer tubular heating members 7 are at one end seated in and preferably welded to bosses 212 of headers 213 which are provided with alternating chambers 214 and 215 each communicating with the open end of two of the outer tubular members 7. The opposite ends of the outer tubular members 7 are seated in peripheral recesses in heads 216 and preferably are welded to said heads. A cylindrical fitting 217, having a closed end abutting against each head 216, is secured to the head 216 axially thereof by a shaft or rod 218 extending therethrough and having thereupon a nut 219 adapted to clamp the fitting 217 firmly upon the head 216. The fitting 217 is provided with lateral ports 220.

The end of each inner tubular heating member 8 is seated in a peripheral recess 221 in the fitting 217 and desirably is welded to the fitting. Each tube 8 is provided with and welded to a head or plug 222 having a central aperture into which a pipe 223 extends and is welded thereto. Each pipe 223 is slidably mounted in an insulated bearing 224 mounted in an aperture in the header 213. This bearing may be constructed as heretofore described in which the bearing is mounted in an insulating disk 225 of porcelain, moulded asbestos compound, or other materal having heat resisting characteristics, the disk being secured against the shoulder of a countersink in the header by an externally screw threaded ring nut 226. The bearing 225 desirably is provided with a gland 227 and packing 228.

By thus slidably mounting the pipe 223 in the bearing 224, relative longitudinal movement between the heater tubes 7 and 8 is permitted which will avoid injury to the apparatus because of unequal expansion of said tubes.

In order to permit longitudinal expansion of the outer tubes 7 the shaft or rod 218 is provided with an extension 229 which is slidably mounted in a suitable support or standard 230. The shaft 218 and extension 229 are provided at adjacent ends with flanges which are secured together and separated by suitable insulation 231 adapted to prevent the passage of an electric current from the tubular heating members to the standard 230.

Oil, or other suitable heat transferring fluid, is introduced from a suitable pump (not shown) through a pipe 232 into the pipe 221 leading to the inner tubular member of the lowest unit A of the series and flows through the inner heating tube 8 and apertures 220 in the fitting 217 into the outer tubular heating member 8 through which it flows in the opposite direction into the chamber 215 of the header. From the chamber 215 the heat transferring fluid flows longitudinally through the outer tubular member of the next unit B of the series which is located above the unit A and thence through the port 220 in the fitting 217 of that member to the interior of the inner tubular heating member 8, from which it flows through the pipe 223 and through a return bend 233 to the inner tubular heating member of the next superimposed unit C, from which it flows through the ports 220 of the fitting 217 into the outer tubular heating member 8 and through the outer member in the opposite direction into the chamber 214 of the header which communicates with the outer tubular member of the next superimposed unit D.

The heat transferring fluid continues its passage alternately back and forth through the heating members in the manner above described throughout the entire series from which it may be returned to the pump as above described in connection with the preceding embodiments of the invention.

A high tension electric current is supplied through suitable conductors to the primary 234 of a step-down transformer and a heating current of relatively low voltage and high amperage is supplied from the secondary 235 of the transformer to the tubular heating members. As illustrated herein a polyphase alternating current is supplied in which the current from one end of the secondary passes through the conductor 236 and branches 237 to the fluid conducting tubes 223 leading to the units A and D.

The current from the opposite end of the secondary is carried through the conductor 238 and branch 239 to the return bend 233 which connects the tubes 223 leading to the inner tubular heating members B and C. Return branches 240 connected to the header 213 lead to the return conductor 241 which is connected to the central portion of the transformer and to ground.

By reason of this construction the electric current is caused to pass through the outer and inner tubes of each unit in opposite directions and thereby to neutralize the effect of self-induction.

In this construction, as in others heretofore described, either or both of the outer and inner tubular heating members may be of material having high electrical resistance. Under certain conditions the outer tubular member 7 may be constructed of metal having relatively low electrical resistance as, for example, when hydrochloric acid is to be treated a high silicon iron may be used, or when sulphuric acid is to be treated, lead employed, in which case little or no heat would be generated in the outer tube. The inner tube 8 would then be made of high resistance material and the entire heat generated in the inner tube transmitted to the outer tube by means of the circulating body of fluid.

Under other conditions the inner tubular member 8 may be copper, or other low resistance material, and the outer tubular member 7 of high resistance material, in which case substantially all the heat would be generated directly in the outer tube and uniformity of heat maintained throughout the length thereof by the circulating liquid.

Another arrangement of heating tubes is illustrated in Fig. 19 which may be employed where it is desirable only to use a vertical series of single tubular heating members. In this construction the tubular heating members 7 are connected at opposite ends with alternating return bends 242 which desirably are provided with plugs or plates 243 covering apertures arranged axially of the tubular members. The return bends may be carried by suitable standards (not shown) upon supports of insulating material separating the headers of the respective ends.

By this arrangement a circulating heat transferring fluid may be introduced into the lowermost header and circulated progressively through the superimposed heating tubes of the series in the manner heretofore described.

In this construction heating units E, F, and G, of the series are illustrated, together with the manner in which the electric heating current is supplied to them. Desirably a three-phase step-down transformer is employed comprising a primary 244 and a secondary 245 from the outer end of which a conductor 246 is connected by a branch 247 to the return bend of the unit E. A conductor 248, leading from the opposite end of the secondary of the transformer, is connected by a branch 249 to the header of the unit G, while the conductor 250 of the central portion of the transformer is connected by a branch 251 to the header of the unit F. By reason of this construction the electric current passes through adjacent tubes in opposite directions, thereby neutralizing the effect of self-induction.

Under some circumstances it may be desirable to heat a cascading sheet of fluid by a vertical series of tubes and without employing a circulating heat transferring fluid. Such a construction is illustrated in Fig. 20 in which the heating tubes 7 of high resistance material are mounted at their ends in headers 252 and 253 upon which they are supported and electrically connected, preferably by welding.

In this construction each tube is provided centrally of its length with a disk or wall 254 of metal having low resistance. The electric current is conducted directly from its source to these disks and is returned to said source from the headers. In this construction a direct current may if desired be employed. As illustrated the current is supplied to the primary 255 of a step-down transformer and the current delivered from the secondary 256 through a conductor 257 and branches 258 to the disks 254 and after passing through the portions of the tube between the disks and the adjacent end of the tubular heating member is returned through the header 252 and branches 259 to the common return conductor 260 leading to the other end of the secondary of the transformer.

It will be understood that the various different apparatus and constructions disclosed herein are of an illustrative character and that other changes in form, construction, arrangement of parts, and embodiments of the invention, may be made within the spirit and scope of the following claims, and such suitable electric current may be employed;—whether direct, alternating, or polyphase,—as may be available and adapted to the particular type of apparatus used.

Having thus described the invention, what is claimed as new, and desired to be secured by Letters Patent, is:

1. An apparatus for heating fluids comprising substantially vertically arranged heating means presenting oppositely disposed large heat radiating surface areas, means for electrically heating the same, and means for causing a portion of the fluid to be heated to cascade over the surface of each of said heating areas.

2. An apparatus for heating fluids comprising a plurality of vertically arranged heating means having thin walls of relatively high electrical resistance material presenting large heat radiating surface areas, means for causing an electric heating current of relatively low voltage and high amperage to pass therethrough, and means for causing the fluid to be heated to cascade over said heat radiating areas.

3. An apparatus for heating fluids comprising a plurality of substantially parallel, vertically arranged heating means having thin walls of high electrical resistance presenting a large heat radiating surface area, means for causing an electric heating current of relatively low voltage and high amperage to pass therethrough, and means for causing the fluid to be heated to cascade over oppositely disposed surfaces of said heating means.

4. An apparatus for heating fluids comprising a vertical series of substantially horizontal, narrowly spaced, tubular members, means for electrically heating the same, means for passing fluid to be heated over oppositely disposed points on said members and means for maintaining the heat radiating surface of each tubular member at a substantially uniform temperature throughout its length.

5. An apparatus for heating fluids comprising a vertical series of substantially horizontal, narrowly spaced, tubular members, means for electrically heating the same, means for causing a heat transferring fluid to flow through said tubular heating members to maintain the heat radiating surface of each tubular member at a substantially uniform temperature throughout its length, and means for causing the fluid to be heated to cascade over the surfaces of said tubular heating members.

6. An apparatus for heating fluids comprising a vertical series of substantially horizontal, narrowly spaced, tubular heating members, each having a wall of high electrical resistance extending throughout the effective length thereof, means for passing an electric heating current therethrough, and means for causing the fluid to be heated to cascade over said tubular members.

7. An apparatus for heating fluids comprising a vertical series of substantially horizontal, narrowly spaced, tubular heating members, each having a wall of high electrical resistance extending throughout the effective length thereof, means for passing an electric heating current therethrough, and means for circulating a heat transferring fluid progressively through said tubular members, and means for causing the fluid to be heated to cascade over said tubular members.

8. An apparatus for heating fluids comprising a plurality of vertically arranged heating members each having a wall of high electrical resistance presenting a large surface area, a conductor of relatively low electrical resistance extending in parallelism therewith and in proximity thereto, means for passing an electric heating current through said conductor and said high resistance wall in opposite directions to neutralize the effect of self-induction, and means for causing the fluid to be heated to cascade over the surfaces of said heating members.

9. An apparatus for heating fluids comprising a vertical series of substantially horizontal, narrowly spaced, tubular heating members, each having substantially concentric inner and outer walls, one of said walls being of relatively higher electrical resistance than the other, means for passing an electric heating current through the inner and outer walls of each heating member in opposite directions to neutralize the effect of self-induction, means for circulating a heat transferring fluid through said tubular heating members, and means for causing the fluid to be heated to cascade over said tubular heating elements.

10. An apparatus for heating fluids comprising a vertical series of substantially horizontal, narrowly spaced, tubular heating members, each having an outer wall formed in sections extending substantially one-half the length of the tubular member, and an inner wall extending substantially the full length of said members, one of said walls being of relatively higher electrical resistance than the other, means for passing an electric current through said inner wall and from the center thereof to the ends of the outer wall, means for circulating a heat transferring fluid through said tubular heating members, and means for causing the fluid to be heated to cascade over said tubular heating members.

11. An apparatus for heating fluids comprising a vertical series of substantially horizontal, narrowly spaced tubular heating members, each having substantially concentric inner and outer walls, one of said walls being of relatively higher electrical resistance than the other, means for passing an electric heating current through the inner and outer walls of each heating member in opposite directions to neutralize the effect of self-induction, means for circulating a heat transferring fluid through said tubular heating members between the inner and outer walls thereof, and means for causing the fluid to be heated to cascade over said tubular heating members.

12. An apparatus for heating fluids comprising a plurality of vertically arranged heating members, presenting a large surface area, means for electrically heating said members, means for causing the fluid to be heated to cascade over the surface of said heating members, and heat exchanging means located below said heating members to receive said fluid and operable to subject said fluid to radically different temperatures from those produced by said heating members.

13. A fluid heating and evaporating apparatus comprising a vertical series of narrowly separated horizontal tubular members of downwardly decreasing lengths, having means for causing the fluid gradually to flow toward the vertical central plane of said lengths, means for electrically heating said members, and means for causing the fluid to be heated to cascade over said heating members.

14. A fluid heating and evaporating apparatus comprising a vertical series of narrowly spaced horizontally disposed tubular members of downwardly decreasing length inclining slightly downwardly from their ends to the vertical central plane of their lengths, means for electrically heating said tubular members, and means for causing the fluid to be heated to cascade over said heating members.

15. A fluid heating and evaporating apparatus comprising a closed casing, a vertical series of horizontally disposed tubular heating members, means for electrically heating said members, means for causing the fluid to be heated to cascade over said heating members, and means for separately removing from said casing volatile products produced at different distillation temperatures.

16. A fluid heating and evaporating apparatus comprising a closed casing, a vertical series of horizontally disposed tubular heating members, means dividing said casing into a vertical series of compartments, each containing certain of said heating members, means for electrically heating said tubular members, means for causing the fluid to be heated to cascade over said heating members, and means for separately removing from each compartment the volatile products distilled from said fluid in such compartment.

17. A fluid heating and evaporating apparatus comprising a closed casing, a vertical series of horizontally disposed tubular heating members, means dividing said casing into a vertical series of compartments, each containing certain of said heating members, means for electrically heating said tubular members, means for causing the fluid to be heated to cascade over said heating members, means operable respectively to control the temperatures of the heat generated in the heating members of the respective compartments, and means for separately removing from each compartment the volatile products distilled from said fluid in such compartment.

18. A fluid heating and evaporating apparatus comprising a closed casing, a vertical series of horizontally disposed tubular heating members, means dividing said casing into a vertical series of compartments, each containing certain of said heating members, means for electrically heating said tubular members, means for causing the fluid to be heated to cascade over said heating members, thermostatically operable means subject respectively to the temperatures in the respective compartments operable automatically to maintain in each compartment a substantially constant predetermined temperature, and means for removing from each compartment the volatile products distilled from said fluid in such compartment.

19. A fluid heating and evaporating apparatus comprising a closed casing, a vertical series of horizontally disposed tubular heating members, means dividing said casing into a vertical series of compartments, each containing certain of said heating members, means for electrically heating said tubular members, means for causing the fluid to be heated to cascade over said heating members, means for separately circulating a heat transferring fluid through the tubular heating members of each compartment to maintain the heat radiating surface of each member substantially uniform throughout its length, and means for separately removing from each compartment the volatile products distilled from said fluid in such compartment.

20. A fluid heating apparatus comprising a vertical series of substantially horizontal, narrowly separated, tubular heating members, each having a wall of high electrical resistance, means for passing an electric current through said high resistance walls, headers for the ends of said heating members having means to direct a circulating fluid progressively through said tubular members, means for circulating a heat transferring fluid therethrough, and means for causing the fluid to be heated to cascade over said heating members.

21. A fluid heating apparatus comprising a vertical series of substantially horizontal, narrowly separated, tubular heating members, each comprising an outer tube and an inner tube concentric therewith, one of said tubes having a wall of high electrical resistance, means for passing an electric heating current through said tubes, headers for the ends of said outer tubes having means to direct a circulating fluid progressively through alternating heating members in opposite directions, means for circulating a heat transferring fluid therethrough, and means for causing the fluid to be heated to cascade over said heating members.

22. A fluid heating apparatus comprising a vertical series of substantially horizontal, narrowly separated, tubular heating members, each comprising an outer tube and an inner tube concentric therewith, one of said tubes having a wall of high electrical resistance, means for passing an electric heating current through said tubes, headers for the ends of said outer tubes having means to direct a circulating fluid progressively through alternating heating members of said series in opposite directions, means for circulating a heat transferring fluid through said tubes, thermostatic means subject to the temperature of said circulating fluid, means operable by said thermostatic means to control the heating current supplied to said heating members, and means for causing the fluid to be heated to cascade over said heating members.

23. A fluid heating apparatus comprising a vertical series of substantially horizontal, narrowly separated tubular heating members, each comprising an outer tube and an inner tube concentric therewith, one of said tubes having a wall of high electrical resistance, means for passing an electric heating current through said tubes, headers for the ends of said outer tubes having means to direct a heat transferring fluid through said outer tubes, means for circulating a heat transferring fluid therethrough, and means for supporting said outer and inner tubes upon said headers operable to permit relative longitudinal expansion of said inner and outer tubes when subjected to different temperatures, and means for causing the fluid to be heated to cascade over said heating members.

24. A fluid heating apparatus comprising a vertical series of substantially horizontal, narrowly separated, tubular heating members, each comprising an outer tube and an inner tube concentric therewith, one of said tubes having a wall of high electrical resistance, headers for the ends of said tubes having means to direct a circulating fluid through said outer tube, means for circulating a heat transferring fluid therethrough, means electrically connecting the outer tubes to said headers, electrically insulated means supporting an end of each inner tube upon a header, a conductor for an electric heating current having branches connected to said inner tubes, a return conductor connected to a header, means electrically connecting said inner and outer tubes operable to cause the current in adjacent portions of said inner and outer tubes to flow in opposite directions and thereby to neutralize the effect of self-induction, and means for causing the fluid to be heated to cascade over said heating members.

25. A fluid heating apparatus comprising a vertical series of substantially horizontal, narrowly separated, tubular heating members, each comprising an outer tube and an inner tube concentric therewith, one of said tubes having a wall of high electrical resistance, headers for the ends of said tubes, having means to direct a circulating fluid progressively through alternating heating members in opposite directions, means for circulating a heat transferring fluid therethrough, means electrically connecting the outer tubes to said headers, electrically insulated means supporting an end of each inner tube upon a header, a conductor for an electric heating current having branches connected to said inner tubes, a return conductor connected to a header, means electrically connecting said inner and outer tubes operable to cause the current in adjacent portions of said inner and outer tubes to flow in opposite directions, thereby to neutralize the effect of self-induction, and means for causing the fluid to be heated to cascade over said heating members.

26. A fluid heating apparatus comprising a vertical series of substantially horizontal, narrowly separated, tubular heating members, each comprising an outer tube and an inner tube concentric therewith, one of said tubes having a wall of high electrical resistance, headers for the ends of said tubes having means to direct a circulation fluid through said outer tube, means for circulating a heat transferring fluid therethrough, means electrically connecting said outer tubes to said headers, electrically conducting bars connected to the ends of said inner tubes, insulating members mounted in one of said headers having bushings to receive said shafts, means electrically connecting the outer tubes to said headers, a conductor for an electric heating current having branches connected to the shafts of said inner tubes, a return conductor connected to a header, means electrically connecting said inner and outer tubes operable to cause the current in adjacent portions of said inner and outer tubes to flow in opposite directions, thereby to neutralize the effect of self-induction, and means for causing the fluid to be heated to cascade over said heating members.

27. A fluid heating apparatus comprising a vertical series of substantially horizontal, narrowly separated, tubular heating members, each comprising an outer tube and an inner tube concentric therewith, one of said tubes having a wall of high electrical resistance, means for causing the fluid to be heated to cascade over said tubular heating members, headers electrically connected to said outer tubes having means for directing a circulating fluid through said outer tubes, insulating spacing members located at intervals between said inner and outer tubes to maintain the same in concentric relation, and means for causing an electric heating current to flow through said inner and outer tubes in opposite directions.

28. A fluid heating apparatus comprising a vertical series of substantially horizontal, narrowly separated, tubular heating members, each comprising an outer tube and an inner tube concentric therewith, one of said tubes having a wall of high electrical resistance, means for causing the fluid to be heated to cascade over said tubular heating members, headers electrically connected to said outer tubes having means for directing a circulating fluid through said outer tubes, apertured heads electrically connected to said inner tubes, electric conducting members connected to said heads, electrically insulating members mounted in said headers having bearings to receive said conducting members, conductors for an electric heating current connected to said conducting members, a return conductor connected to a header, and means electrically connecting said inner and outer tubes to cause the electric current to flow in opposite directions through adjacent portions of said inner and outer tubes.

29. An apparatus for heating fluids comprising vertically arranged heating members, each having a wall of high electrical resistance presenting a large surface area, means for passing an electric heating current through said high resistance wall, means for causing the fluid to be heated to cascade over the surface of said heating member, and means controlled by the flow of fluid to be heated operable to cut off said electric current upon interruption or cessation of flow of the fluid to be heated.

30. An apparatus for heating fluids comprising a vertical series of substantially horizontal, narrowly spaced, tubular members having walls of high electrical resistance, means for passing an electric heating current therethrough, means for causing a heat transferring fluid to flow through said tubular heating members to maintain the heated surface of each tubular member substantially uniform throughout its length, thermostatic means subject to the temperature of said heat transferring fluid, and means operable thereby to regulate the current supplied to said heating members, means for causing the fluid to be heated to cascade over the surfaces of said heating members, and means operable by the flow of the fluid to be heated, supplied to said heating members, operable to cut off said electric current upon interruption or cessation of said flow.

In testimony whereof, I have signed my name to this specification.

ROBERT A. CARLETON.